United States Patent
Das et al.

(10) Patent No.: US 9,936,042 B2
(45) Date of Patent: Apr. 3, 2018

(54) LOCAL RETRIEVING AND CACHING OF CONTENT TO SMALL CELLS

(71) Applicant: QUALCOMM Incorporated, San Diego, CA (US)

(72) Inventors: Soumya Das, San Diego, CA (US); Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/839,262

(22) Filed: Aug. 28, 2015

(65) Prior Publication Data

US 2017/0064029 A1    Mar. 2, 2017

(51) Int. Cl.
| | |
|---|---|
| *H04L 12/28* | (2006.01) |
| *H04L 29/08* | (2006.01) |
| *H04W 28/06* | (2009.01) |
| *H04W 4/02* | (2018.01) |
| *H04W 4/18* | (2009.01) |
| *H04W 84/04* | (2009.01) |
| *H04W 88/08* | (2009.01) |

(52) U.S. Cl.
CPC ...... *H04L 67/2842* (2013.01); *H04L 67/2847* (2013.01); *H04L 67/306* (2013.01); *H04W 4/028* (2013.01); *H04W 4/18* (2013.01); *H04W 28/06* (2013.01); *H04W 84/042* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,731,940 | B1 | 5/2004 | Nagendran |
| 8,149,095 | B2 | 4/2012 | Hayashi et al. |
| 8,271,507 | B2 | 9/2012 | Farmer |
| 8,392,912 | B2 | 3/2013 | Davis et al. |
| 8,588,132 | B1 | 11/2013 | Paczkowski et al. |

(Continued)

FOREIGN PATENT DOCUMENTS

| | | |
|---|---|---|
| EP | 2051198 A1 | 4/2009 |
| EP | 2239967 A1 | 10/2010 |

(Continued)

OTHER PUBLICATIONS

ISA/EP, International Search Report and Written Opinion of the International Searching Authority, Int'l Application No. PCT/US2016/039848, dated Sep. 20, 2016, European Patent Office, Rijswijk, NL, 10 pgs.

(Continued)

*Primary Examiner* — Chi H Pham
*Assistant Examiner* — Fahmida Chowdhury
(74) *Attorney, Agent, or Firm* — Holland & Hart LLP

(57) ABSTRACT

An example method includes determining an operating context of a small cell, wherein a base station of the small cell is co-located with an edge computing device. The method may further retrieving content from a network to the edge computing device based at least in part on the operating context and storing the content at the edge computing device for subsequent access by a mobile device in the small cell.

26 Claims, 11 Drawing Sheets

(56) References Cited

U.S. PATENT DOCUMENTS

| | | | |
|---|---|---|---|
| 8,634,826 B1* | 1/2014 | Cope | H04W 8/22 |
| | | | 370/328 |
| 8,750,857 B2 | 6/2014 | Krishnaswamy et al. | |
| 8,798,017 B2 | 8/2014 | Liu et al. | |
| 9,001,659 B2 | 4/2015 | Sun et al. | |
| 2003/0035464 A1 | 2/2003 | Dehner et al. | |
| 2003/0101213 A1 | 5/2003 | Wright | |
| 2004/0116115 A1 | 6/2004 | Ertel | |
| 2006/0059044 A1 | 3/2006 | Chan et al. | |
| 2006/0259359 A1 | 11/2006 | Gogel | |
| 2006/0271695 A1 | 11/2006 | Lavian | |
| 2007/0038994 A1* | 2/2007 | Davis | H04L 63/0227 |
| | | | 717/174 |
| 2008/0004950 A1 | 1/2008 | Huang et al. | |
| 2008/0049020 A1 | 2/2008 | Gusler et al. | |
| 2008/0270379 A1 | 10/2008 | Ramakrishna | |
| 2010/0057563 A1 | 3/2010 | Rauber et al. | |
| 2010/0151821 A1 | 6/2010 | Sweeney et al. | |
| 2010/0295676 A1 | 11/2010 | Khachaturov et al. | |
| 2010/0318417 A1 | 12/2010 | Brisebois et al. | |
| 2011/0047030 A1 | 2/2011 | Yoon et al. | |
| 2011/0287787 A1 | 11/2011 | Nagaraja et al. | |
| 2011/0306324 A1 | 12/2011 | Jang et al. | |
| 2012/0016961 A1 | 1/2012 | Tuikka | |
| 2012/0142319 A1 | 6/2012 | Joshi et al. | |
| 2012/0158816 A1 | 6/2012 | Choi et al. | |
| 2012/0310717 A1 | 12/2012 | Kankainen | |
| 2012/0310746 A1 | 12/2012 | Zhao et al. | |
| 2013/0031204 A1* | 1/2013 | Graham | H04L 67/2847 |
| | | | 709/217 |
| 2013/0054729 A1 | 2/2013 | Jaiswal et al. | |
| 2013/0109371 A1 | 5/2013 | Brogan et al. | |
| 2013/0110617 A1 | 5/2013 | Phan et al. | |
| 2013/0151654 A1* | 6/2013 | Brech | G06F 17/30902 |
| | | | 709/216 |
| 2013/0212212 A1 | 8/2013 | Addepalli et al. | |
| 2013/0244612 A1 | 9/2013 | Burckart et al. | |
| 2013/0267252 A1 | 10/2013 | Rosenberg | |
| 2013/0316708 A1 | 11/2013 | MacPherson | |
| 2014/0022920 A1 | 1/2014 | Dua et al. | |
| 2014/0022985 A1 | 1/2014 | Kalmbach et al. | |
| 2014/0098734 A1 | 4/2014 | Kalhan et al. | |
| 2014/0129354 A1 | 5/2014 | Soon-Shiong | |
| 2014/0143438 A1 | 5/2014 | Kagan et al. | |
| 2014/0156793 A1 | 6/2014 | Chan et al. | |
| 2014/0171039 A1 | 6/2014 | Bjontegard | |
| 2014/0173110 A1 | 6/2014 | Uetabira | |
| 2014/0241315 A1 | 8/2014 | Niu et al. | |
| 2014/0297822 A1 | 10/2014 | Agrawal et al. | |
| 2014/0310709 A1 | 10/2014 | Nirantar | |
| 2014/0337458 A1 | 11/2014 | Barton | |
| 2014/0373032 A1 | 12/2014 | Merry et al. | |
| 2015/0046656 A1 | 2/2015 | Blinick et al. | |
| 2015/0067791 A1 | 3/2015 | Matus | |
| 2015/0088656 A1 | 3/2015 | Singh | |
| 2015/0133091 A1 | 5/2015 | Baldwin et al. | |
| 2015/0161643 A1 | 6/2015 | Randell et al. | |
| 2015/0293926 A1 | 10/2015 | Yang et al. | |
| 2015/0347730 A1 | 12/2015 | Matus | |
| 2015/0351156 A1 | 12/2015 | Xie et al. | |
| 2016/0029214 A1 | 1/2016 | Lu | |
| 2016/0049071 A1 | 2/2016 | Beaver et al. | |
| 2016/0195861 A1 | 7/2016 | Chen et al. | |
| 2016/0343032 A1 | 11/2016 | Dewitt et al. | |
| 2016/0353424 A1 | 12/2016 | Stirling-Gallacher et al. | |
| 2017/0064037 A1 | 3/2017 | Das et al. | |
| 2017/0064066 A1 | 3/2017 | Das et al. | |
| 2017/0064609 A1 | 3/2017 | Park et al. | |
| 2017/0064616 A1 | 3/2017 | Park et al. | |
| 2017/0104839 A1 | 4/2017 | Starsinic et al. | |
| 2017/0268890 A1 | 9/2017 | Barnard et al. | |

FOREIGN PATENT DOCUMENTS

| | | |
|---|---|---|
| EP | 2575044 A1 | 4/2013 |
| EP | 2820869 A1 | 1/2015 |
| WO | WO-0169387 A2 | 9/2001 |
| WO | WO-2011153503 A1 | 12/2011 |
| WO | WO-2014131000 A2 | 8/2014 |
| WO | WO-2015027246 A1 | 2/2015 |

OTHER PUBLICATIONS

Giannoulakis et al., "On the Applications of Efficient NFV Management towards 5G Networking," 1st International Conference on 5G for Ubiquitous Connectivity, Nov. 26-28, 2014, 5 pgs, ISBN: 978-1-6319-0055-6, DOI: 10.4108/ICST.5GU.2014.258133, XP032735044, Institute of Electrical and Electronics Engineers.

Munoz et al., "Joint Allocation of Radio and Computational Resources in Wireless Application Offloading," Future Network & Mobile Summit 2013 Conference Proceedings, Jul. 3, 2013, pp. 1-10, ISBN: 978-1-905824-37-3, XP032506950, IIMC International Information Management Corporation.

Barbarossa et al., "Communicating While Computing: Distributed Mobile Cloud Computing Over 5G Heterogeneous Networks," IEEE Signal Processing Magazine, Nov. 2014, pp. 45-55, vol. 31 (6), ISSN: 1053-5888, DOI: 10.1109/MSP.2014.2334709, XP011561537, IEEE Service Center, Piscataway, NJ.

* cited by examiner

LOCAL RETRIEVING AND CACHING OF CONTENT TO SMALL CELLS

BACKGROUND

Field of the Disclosure

The present disclosure, for example, relates to wireless communication systems, and more particularly to an edge computing device co-located with a small cell base station.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, space and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple wireless devices. Base stations may communicate with wireless devices on downstream and upstream links. Each base station has a coverage range, which may be referred to as the coverage area of the cell. Some of these base stations may be lower-powered base stations, such as a picocells, femtocells, or microcells. Such small cell base stations cover a smaller geographic area than macro cells and allow access by user equipments (UEs) with service subscriptions with the network provider.

Current wireless wide area networks (WWANs) generally place content and cloud resources on nodes outside of the mobile network operator's WWAN, far from the wireless device of the end user accessing the nodes on the other side of the WWAN. Similarly, users of wireless local area networks (WLAN) generally access content and cloud resources on these nodes, which makes the nodes likewise far from the wireless device of the end user accessing the WLAN. When an end user in communication with a wireless network near the edge of the WWAN or in a WLAN requests content or services, via their wireless device, the content is generally downloaded from these nodes through the WWAN or WLAN, and delivered to the wireless device via a radio link. Subsequent requests for the same content result in the content being downloaded again from the nodes, through the WWAN or WLAN to the wireless device. In addition, video traffic has increased to an ever-larger proportion of data transmitted over WWANs and WLANs. Unpredictable spikes in demand due to viral videos and live television programming, increases in display and content resolution, and the introduction of enhanced user features have all contributed to this increased growth in data usage. Duplication of requested content can waste resources on the backhaul and transport networks. Similarly, during times of high demand where traffic congestion may occur, content delivery may be affected such that the user experience is reduced. For example, costs of providing the requested data may rise, latency or buffering may increase, and/or the quality of delivered data may be reduced, e.g., by transcoding video to a reduced quality level.

Furthermore, wireless devices may have limited battery life and processing power, mobile devices in particular. Applications and processes running on a wireless device, including to decode and encode content for transmission on the WWAN or WLAN, may use significant mobile device resources. Execution of these applications and processes may shorten battery life and degrade device performance.

SUMMARY

Small cell base stations are radio access nodes that operate beneath the level of the macrocell infrastructure in a wireless network. The small cells may include microcells, femtocells, picocells, Wi-Fi access points, and access points that integrate wireless wide area network (WWAN) and wireless local area network (WLAN) functions. A small cell base station may include a base station that may be co-located with an edge computing device. The edge computing device may be integrated within a small cell base station or be a physically separate module communicatively coupled to and in proximity with the small cell base station that provides edge computing resources at the small cell. The edge computing device may determine network content that may be reused by one or more users within the small cell or a neighboring small cell. The edge computing device may download the content once and store the content where it is locally accessible. That is, the edge computing device may retrieve and store content that may be requested multiple times by one or more users within the small cell base station or neighboring small cells instead of individually retrieving the content each time it is requested. In some examples, the small cell or a neighboring small cell may use the edge computing resources itself, which may be anytime or at certain times.

In a first set of illustrative examples, a method for wireless communication is described. In one configuration, the method includes determining an operating context of a small cell, wherein a base station of the small cell is co-located with an edge computing device. The method further includes retrieving content from a network to the edge computing device based at least in part on the operating context. The method also includes storing the content at the edge computing device for subsequent access by a mobile device in the small cell.

In a second set of illustrative examples, an apparatus for wireless communication is described. In one configuration, the apparatus includes a processor, a memory in electronic communication with the processor, and instructions stored in the memory. The instructions are operable, when executed by the processor, to cause the apparatus to determine an operating context of a small cell, wherein a base station of the small cell is co-located with an edge computing device, retrieve content from a network to the edge computing device based at least in part on the operating context, and store the content at the edge computing device for subsequent access by a mobile device in the small cell.

In a third set of illustrative examples, an apparatus for wireless communication is described. In one configuration, the apparatus includes means for determining an operating context of a small cell, wherein a base station of the small cell is co-located with an edge computing device. The apparatus also includes means for retrieving content from a network to the edge computing device based at least in part on the operating context. The apparatus further includes means for storing the content at the edge computing device for subsequent access by a mobile device in the small cell.

In a fourth set of illustrative examples, a non-transitory computer-readable medium storing computer-executable code for wireless communication is described. In one configuration, the computer-executable code is executable by a processor to cause a wireless device to determine an operating context of a small cell, wherein a base station of the small cell is co-located with an edge computing device. The computer-executable code is further executable by the processor to cause the wireless device to retrieve content from a network to the edge computing device based at least in part on the operating context and store the content at the edge computing device for subsequent access by a mobile device in the small cell. Retrieving content from the network is further based on a likelihood of reusability of the content in some examples.

Some examples of the methods, apparatuses, communication devices, and non-transitory computer-readable mediums include transferring the content from the small cell to a second small cell based at least in part on an expected change in a physical location of the mobile device. Other examples include determining the expected change in the physical location of the mobile device based at least in part on data relating to a change in a physical location of a second mobile device previously in the small cell.

In some examples, the operating context is a user profile associated with the mobile device. Some examples further include generating the user profile based at least in part on a data packets received by the small cell or a nearby small cell from a plurality of mobile devices previously wirelessly in communication with the small cell or the nearby small cell. In some examples, the operating context is a physical location of the small cell. The operating context may include data relating to prior requests for the content by a second mobile device previously in the small cell. The operating context is based at least in part on related content previously requested by the mobile device from the network via the small cell in some examples.

Determining the operating context of the small cell may include gathering sensor data from a sensor associated with the small cell. The sensor may be one or more of a microphone, a temperature sensor, a light sensor, or a camera. In some examples, the content includes HyperText Transfer Protocol (HTTP) content and web page data. Wireless communication resources of the base station are housed in a first module in some examples and the edge computing device is housed in a second module in communication with the first module.

The small cell may be one of a picocell, a femtocell, a microcell, or a Wi-Fi access point. In some examples, the small cell includes a wireless wide area network (WWAN) transceiver and a wireless local area network (WLAN) transceiver.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
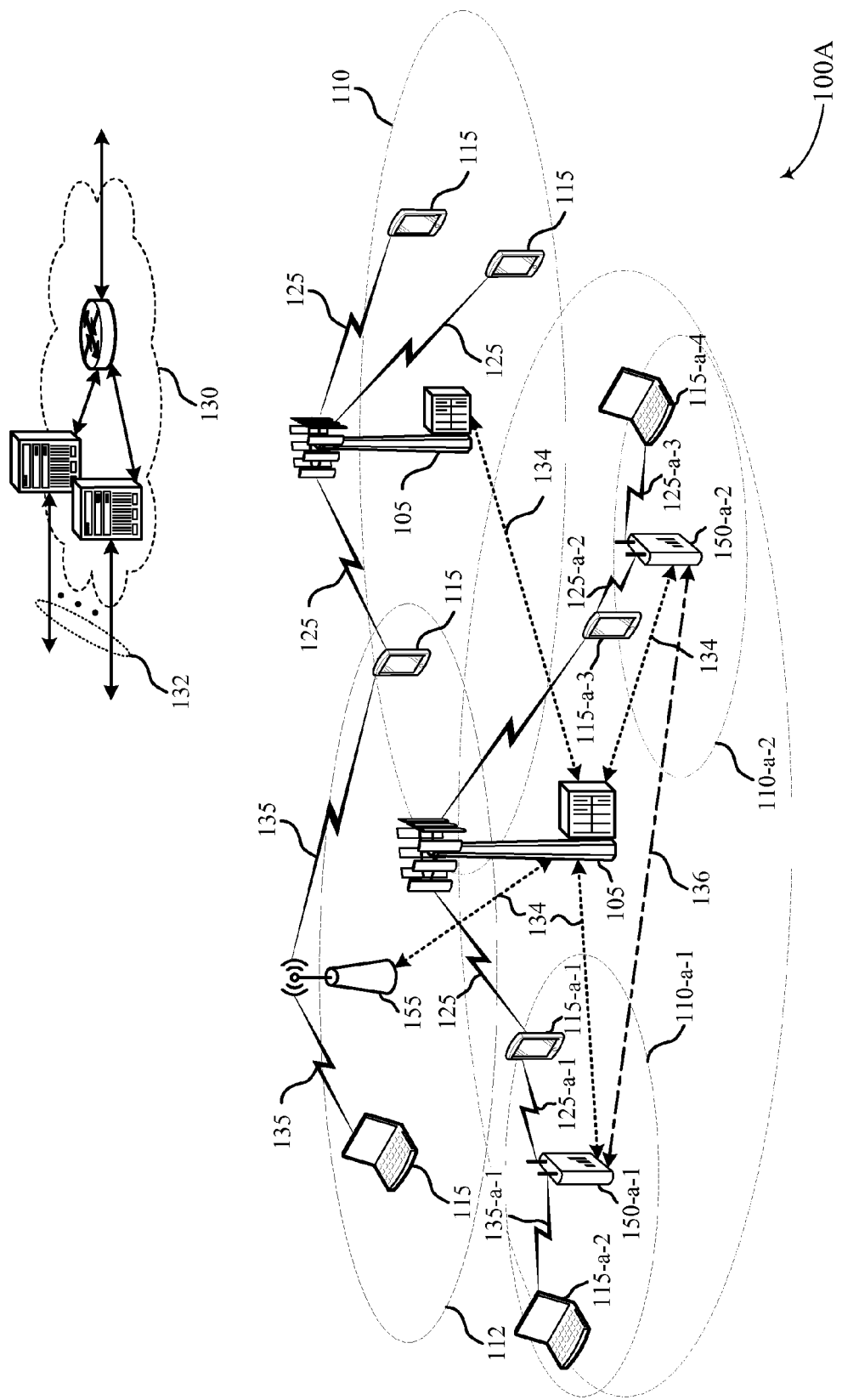
FIG. 1A shows a block diagram of a wireless communications system, in accordance with various aspects of the present disclosure.

In the description that follows, an edge computing device may be co-located with a small cell base station. A small cell base station may include a wireless wide area network (WWAN) radio that operates in licensed and unlicensed spectrum. The WWAN radio may include adaptations that enable operation with other unlicensed band technologies. Small cell base stations, in addition to having WWAN radios, may have wireless local area network (WLAN) radios to connect to a WLAN (e.g., Wi-Fi, Wi-Max, ZigBee, Bluethooth, etc.). Thus, a small cell base station may also act as a WLAN access point according to the present disclosure. Small cells are radio access nodes that operate beneath the level of the macrocell infrastructure in a wireless network, e.g., microcells, femtocells, picocells, Wi-Fi access points, and access points that integrate WWAN and WLAN functions. Furthermore, small cells have a range that is small compared to macrocells. An edge computing device may be integrated within a small cell base station, or may be a physically separate device that is in communication with the small cell base station. In either case, an edge computing device may be proximate to a user's wireless device that is in communication with the edge computing device via the wireless resources of the small cell. The proximity of small cell base stations to an associated wireless device's position may be harnessed to provide enhanced support and services to the wireless device and its users.

The described edge computing devices may support the dynamic distribution of processing of data and/or content between the edge computing device and a wireless device wirelessly in communication with the edge computing device through a small cell. The edge computing devices may also prefetch content, for example webpages, content, and data, and cache it to the edge computing device based on the specific context of a wireless device determined relative to a small cell. An edge computing device may also host an advertising server or engine, providing enriched local advertising, augmented advertisement or other contents, and enabling the augmentation of a user's experience using an output display device in the proximity of the wireless device user. Examples of such augmentation may include providing augmented reality images on top of local mapping data on a mobile device, adding sound, light, and/or other effects on another device, for example on a television, display or other output device in an electronics store. In another example different colored blinking lights on a television or other display may be used to indicate the locations of different people as they move about the electronics store. The augmentation may be of actual reality, for example, by providing sounds, smells, visual stimuli, such as by means of lights, or physical objects, such as bubbles or confetti, to the user of a mobile or wireless device.

The edge computing devices discussed herein may also operate as enriched local advertising server to augment advertising at the edge computing device or augment a user's experience at an output near the edge computing device. As used herein, advertising may refer to a commercial advertisement, for example to encourage a user to purchase a product or service, but may also refer to the display, communication, or other dissemination of information to a user. For example, a museum may user advertising to tell members of an audience where the displays are in a museum. In another example, a business, my advertising the location of a business meeting to tell a user where to go. These computing resources, as well as additional computing resources that may be surplus or provided specifically for this purpose, may also be provided to host applications, including third party applications, at the edge computing device and offer services for the small cell users. In some examples, a small cell platform is used to host applications/services for a group of neighboring small cells that may not have the spare compute and other resources (e.g., the small cells may have different capabilities). Surplus computing resources may be extra computing resources for use during a worst-case processor load. The difference between the total computing resources and the computing resources being used under a current processor load is the surplus computing resources. In some examples, the surplus computing resources are additional cores of a multi-core design that may be powered down when computing needs are less. In another example, the surplus computing resources may be a core that is designed for a maximum frequency but is currently operating at a lower frequency.

The described edge computing devices are located away from nodes but are instead in close proximity to wirelessly-connected wireless devices i.e., end users. The disclosed edge computing devices enable local analytics and knowledge generation to occur at the source of the data, near an end user, and leverages resources that may not be continuously in communication with a network such as laptops, smartphones, tablets, and sensors. The herein described edge computing devices may improve response times for requests from wireless devices in communication with the WWAN or WLAN, as well as increase the amount of data that can be used in environments where there is a limited data connection (e.g., which may be due to available backhaul after radio access network (RAN) resources are met). Prefetching, caching, processing, and/or serving data at the edge computing devices, co-located with small cell base stations, may also reduce overall demand on the backhaul network or internet and help limit signaling and user traffic to and/or from core networks.

The following description provides examples that are is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1A illustrates an example of a wireless communications system 100A in accordance with various aspects of the disclosure. The wireless communications system 100A includes base stations 105, wireless devices 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the wireless devices 115, or may operate under the control of a base station controller. In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the wireless devices 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB (HNB), a Home eNodeB (HeNB), access point, or some other suitable terminology. The geographic coverage area 110 for a base station 105 may be divided into sectors making up only a portion of the coverage area. The wireless communications system 100A may include base stations 105 of different types (e.g., macro and/or small cell base stations). There may be overlapping geographic coverage areas 110 for different technologies.

In some examples, the wireless communications system 100A is a Long Term Evolution (LTE) or LTE-Advanced (LTE-A) network. In LTE/LTE-A networks, the term evolved Node B (eNB) may be generally used to describe the base stations 105, while the term user equipment (UE) may be generally used to describe the wireless devices 115. The wireless communications system 100A may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a term used by an organization named "3rd Generation Partnership Project" (3GPP) to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A base station for a macro cell may be referred to as a macro eNB or base station. A small cell may be associated with a lower-powered base station, as compared with a macro cell, that may operate in the same or different (e.g., licensed, unlicensed, etc.) frequency bands as a macro cell base station. A base station for a small cell may be referred to as a small cell, a small cell eNB, a small cell base station, a pico eNB or base station, a femto eNB or base station, or a home eNB or base station. A small cell may refer to the communications and devices associated with a small cell base station. For example, small cell base station 150-a-1 may be associated with geographic coverage area 110-a-1, wireless device 115-a-1, communication link 125-a-1, wireless device 115-a-2, and communication link 135-a-1. Similarly, small cell base station 150-a-2 may be associated with geographic coverage area 110-a-2, wireless device 115-a-3, communication link 125-a-2, wireless device 115-a-4, and communication link 125-a-3. A small cell may include picocells, femtocells, and microcells according to various examples. A picocell may cover a relatively smaller geographic coverage area 110 and may allow unrestricted access by UEs with service subscriptions with the network provider. A femtocell also may cover a relatively small geographic area (e.g., a home) and may provide restricted access by UEs having an association with the femtocell (e.g., UEs in a closed subscriber group (CSG), UEs for users in the home, open and multi-operator, and the like). Because a femtocell covers a relatively small geographic footprint, the computing needs of a femtocell may vary significantly from femtocell to femtocell. For example, a femtocell that covers an aisle in a grocery store may have different responsibilities than a femto cell in a library aisle. Thus, femtocells may experience a larger variance in computing needs than macrocells.

Small cell base stations 150 may also include WLAN radios and may additionally function as a Wi-Fi access point (AP) for wireless devices 115. Wireless devices 115 may communicate with a small cell base station 150 having Wi-Fi functionality using communication links 135. The small cell base stations 150 may also communicate directly with each other using communication links 136, which may be wired or wireless, and may also communicate with each other using backhaul links 134. The wireless devices 115 may be Wi-Fi only devices or operate in a Wi-Fi only mode.

The wireless communications system 100A may support synchronous or asynchronous operation. For synchronous operation, the base stations 105 and small cell base stations 150 may have similar frame timing, and transmissions from different base stations 105 or small cell base stations 150 may be approximately aligned in time. For asynchronous operation, the base stations 105 and small cell base stations 150 may have different frame timing, and transmissions from different base stations 105 or small cell base stations 150 may not be aligned in time. The techniques described herein may be used for either synchronous or asynchronous operations.

The wireless devices 115 are dispersed throughout the wireless communications system 100A, and each wireless device 115 may be stationary or mobile. A wireless device 115 may also include or be referred to by those skilled in the art as a mobile station, a subscriber station, a mobile unit, a subscriber unit, a wireless unit, a remote unit, a mobile device, a wireless communications device, a remote device, a mobile subscriber station, an access terminal, a mobile terminal, a wireless terminal, a remote terminal, a handset, a user agent, a UE, a mobile client, a client, or some other suitable terminology. A wireless device 115 may be a cellular phone, a personal digital assistant (PDA), a wireless modem, a wireless communication device, a handheld device, a tablet computer, a laptop computer, a cordless phone, a wireless local loop (WLL) station, or the like. A wireless device 115 may be able to communicate with various types of base stations 105, small cell base stations 150, and network equipment including macro eNBs, small cell eNBs, relay base stations, and the like.

The communication links 125 shown in wireless communications system 100A may include uplink (UL) transmissions from a wireless device 115 to a base station 105, and/or downlink (DL) transmissions, from a base station 105 to a wireless device 115. The downlink transmissions may also be called forward link transmissions while the uplink transmissions may also be called reverse link transmissions. Each of the communication links 125 may include one or more carriers which may be able to carry one or more waveform signals of different frequencies. The waveform signals may be modulated according to the various radio technologies described above. Each modulated signal may carry control information (e.g., reference signals, control channels, etc.), overhead information, user data, and the like. The communication links 125 may transmit bidirectional communications using frequency division duplex (FDD) (e.g., using paired spectrum resources) or time division duplexing (TDD) operation (e.g., using unpaired spectrum resources). Frame structures for FDD (e.g., frame structure type 1) and TDD (e.g., frame structure type 2) may be defined.

In some embodiments of the wireless communications system 100A, base stations 105, small cell base stations 150, and/or wireless devices 115 may include multiple antennas for employing antenna diversity schemes to improve communication quality and reliability between base stations 105 and wireless devices 115. Additionally or alternatively, base stations 105, small cell base stations 150, and/or wireless devices 115 may employ multiple-input, multiple-output (MIMO) techniques that may take advantage of multi-path environments to transmit multiple spatial layers carrying the same or different coded data.

Wireless communications system 100A may support operation on multiple cells or carriers, a feature which may be referred to as carrier aggregation (CA) or multi-carrier operation. A carrier may also be referred to as a component carrier (CC), a layer, a channel, and the like. The terms "carrier," "component carrier," "cell," and "channel" may be used interchangeably herein. A wireless device 115 may be configured with multiple downlink CCs and one or more uplink CCs for carrier aggregation. Carrier aggregation may be used with both FDD and TDD component carriers.

In some embodiments, the wireless communications system 100A may include an AP 155. Wireless devices 115 may communicate with an AP 155 using communication links 135, and each wireless device 115 may also communicate directly with one or more other wireless devices 115 via a direct wireless link. Two or more wireless devices 115 may communicate via a direct wireless link when both wireless devices 115 are in the AP geographic coverage area 112 or when one or neither wireless device 115 is within the AP geographic coverage area. Examples of direct wireless links may include Wi-Fi Direct connections, connections established by using a Wi-Fi Tunneled Direct Link Setup (TDLS)

link, and other peer-to-peer (P2P) group connections. The wireless devices 115 in these examples may communicate according to the WLAN radio and baseband protocol including physical and media access control (MAC) layers from IEEE 802.11, and its various versions including, but not limited to, 802.11b, 802.11g, 802.11a, 802.11n, 802.11ac, 802.11ad, 802.11ah, and the like. In other implementations, other peer-to-peer connections and/or ad hoc networks may be implemented within wireless communications system 100A.

In addition to resources for communicating in wireless communications system 100A as a small cell base station, one or more of small cell base station 150-a-1 and small cell base station 150-a-2 may include or be associated with an edge computing device having a number of edge computing resources to support certain operations for wireless devices 115 wirelessly in communication with a small cell. Thus, the edge computing resources of one or more of small cell base station 150-a-1 and small cell base station 150-a-2 may support the dynamic distribution of processing of data and/or content between the small cell base station 150 and a wireless device 115 wirelessly in communication with the small cell base station 150. The edge computing devices may also prefetch content and cache it to the edge computing device based on the specific context of a wireless device 115. An edge computing device may also host an advertising server or engine, providing enriched local advertising and physical augmentation of advertising. The edge computing device may also operate as an enriched local advertising server. Computing resources of the edge computing device may also be provided to host applications, including third party applications, on the edge computing device one or more of small cell base station 150-a-1 and small cell base station 150-a-2.

Figure 1B:
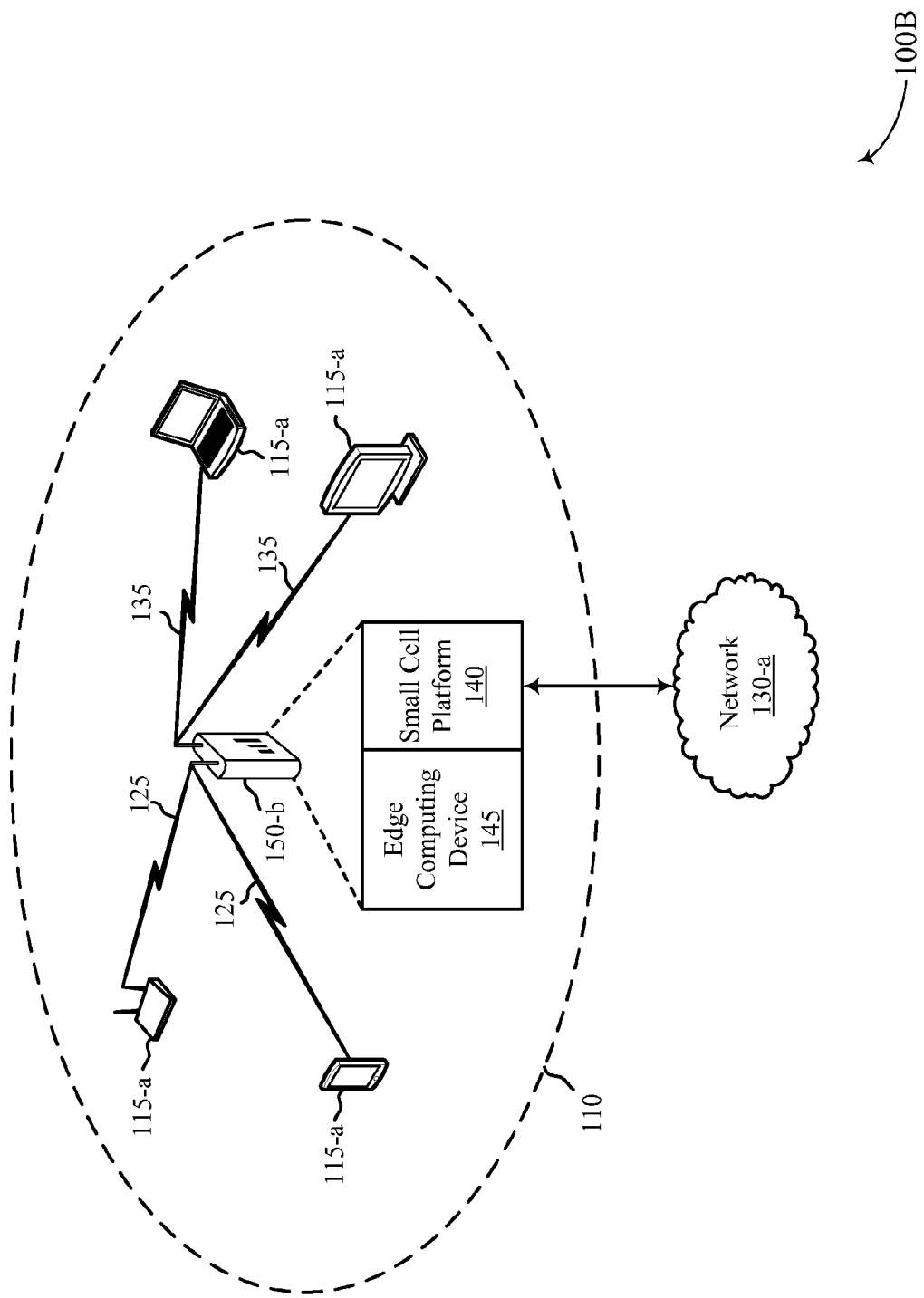
FIG. 1B shows a block diagram of a wireless communications system, in accordance with various aspects of the present disclosure.

Referring to FIG. 1B, a block diagram illustrates an example of a wireless communications network 100B. The wireless communications network 100B may include portions of wireless communications system 100A. The wireless communications network 100B may include a small cell base station 150-b and one or more wireless devices 115-a, such as mobile stations, personal digital assistants (PDAs), other handheld devices, netbooks, notebook computers, tablet computers, laptops, display devices (e.g., TVs, computer monitors, etc.), printers, and the like. Each of the wireless devices 115-a may associate and communicate with small cell base station 150-b via one or more of communication links 125 and communication links 135. Each small cell base station 150-b has a geographic coverage area 110 such that wireless devices 115-a within that area can typically communicate with the small cell base station 150-b. The wireless devices 115-a may be dispersed throughout the geographic coverage area 110. Each wireless device 115-a may be stationary or mobile. In some examples, a wireless device 115-a can be covered by more than one small cell base station 150 and/or macro cell. In other examples, other wireless devices can communicate with the small cell base station 150-b.

Small cell base station 150-b includes a small cell platform 140 and an edge computing device 145. The edge computing device 145 may be integrated within a small cell base station 150-b with the small cell platform 140, or be a physically separate module communicatively coupled to and in close proximity with the small cell platform 140. Thus, the small cell base station 150-b may be a single integrated component or may comprise a greater number of separate components that are communicatively coupled together. In some cases, the small cell platform 140 encapsulates the edge computing device 145. In such instances, the extra processing power on the small cell platform 140 is the edge computing device 145. Small cell base station 150-b, and specifically small cell platform 140, may communicate with core network 130-a, as well as provide connectivity with core network 130-a for the edge computing device 145 and the wireless devices 115-a. The small cell base station 150-b, and specifically the small cell platform 140, may also provide connectivity for the edge computing device 145 with the wireless devices 115-a.

The edge computing device 145 provides a number of edge computing resources and functions at the small cell base station 150-b that will be further set out below and in greater detail throughout this disclosure.

The edge computing device 145 may provide processing resources to support one or more wireless devices 115-a. Processing of data may be dynamically allocated between a wireless device 115-a and an edge computing device 145 co-located with the small cell base station 150-b. Processing responsibilities for data downloaded and to be delivered to the wireless device 115-a can be allocated to the wireless device 115-a, to the edge computing device 145, or split between the wireless device 115-a and the edge computing device 145. The allocation of processing responsibilities can be dynamic, for example based on a state of the wireless device 115-a, the quality of the radio link between the small cell base station 150-b and the wireless device 115-a, and/or the type of data to be delivered to the wireless device 115-a. The edge computing device 145 may be allocated responsibility to decompress (decode) data that is compressed (encoded) based at least in part on the type of compressed data, e.g., specifically for a particular type of compressed video, audio, or image data. Processing of compressed data by the edge computing device 145 may involve decompressing the compressed data, or processing compressed data into a less-compressed state, i.e., decompressing data compressed at a high level into an uncompressed state and then compressing the data using a compression algorithm or encoder using a lower compression level. The edge computing device 145 may also download multiple versions of the same compressed data, where one of the versions is sent to the wireless device 115-a based at least in part on a condition of the radio link or state of the wireless device 115-a.

Processing responsibilities may also be allocated to the edge computing device 145 according to a state of the wireless device 115-a, for example, power consumption at the wireless device 115-a, or processing capability, processing availability or headroom, battery state, coexistence problems due to concurrent utilization of different radios, or thermal state of the wireless device 115-a. Processing may be further allocated to the edge computing device 145 when the processing availability of the wireless device 115-a is below a threshold, when the battery life is below a threshold, where a temperature of the wireless device 115-a is above a threshold, or where the expected power consumption of the processing at the wireless device 115-a would exceed a predetermined power consumption threshold. The edge computing device 145 may also process, or not process, received data according to a processing capability report received from the wireless device 115-a. In addition, the edge computing device 145 may be allocated processing responsibility based on, for example, the observed quality of the radio link between the wireless device 115-a and the edge computing device 145/small cell base station, radio conditions, throughput, measurements, or expected future radio conditions (e.g., where the wireless device 115-*a* is travelling to, hand-off scenarios, loading, etc.).

Content may also be prefetched or otherwise retrieved by the edge computing device 145 and cached locally in anticipation of requests for such content from a wireless device 115-*a*. Prefetching of the content may be determined at least in part on information that is local to the edge computing device 145. Such local information may include the physical location of the edge computing device 145, the physical location of the wireless device 115-*a*, or input about the physical location based on data gathered from a sensor or other input device of the edge computing device 145, e.g., from a microphone, temperature sensor, light sensor, or camera. Local information may also include previously assembled profiles for users of wireless device 115-*a*, including users' past requests for particular data. Local information may also relate to requests made by a user for related content. For example, for a video, prefetched content can include the same video previously requested by users of other wireless devices 115-*a*, the next segment in a series of videos where a segment has been previously requested by a wireless device 115-*a* in communication with the edge computing device 145, or videos related to a video previously fetched in response to a previous request from a wireless device 115-*a*.

Prefetching and locally caching at an edge computing device 145 may use additional storage capacity at the edge computing device 145, but it may be beneficial to allow content to be prefetched during periods of low usage of a backhaul network, saving bandwidth and decreasing latency. Prefetching may also potentially eliminate the need to repeatedly transport the same popular content from the source of the content to the requesting wireless device 115-*a*. Prefetching as described above may be especially beneficial where the content does not change substantially over time (e.g., a certain music video or audio file), and there is a higher likelihood that users of the wireless device 115-*a* will request such content via the edge computing device 145 prior to the content becoming stale. The prefetched content for a particular wireless device 115-*a* may also be transferred from a first edge computing platform to a second edge computing platform based on the expected physical location of the wireless device 115-*a*. Prefetching may also be performed when more power is available (e.g., the sun is out for small cells powered by solar panels) or when power levels are high (e.g., battery backup capacity is topping out). Further, pre-fetching can be performed being context aware. For example, augmented content can be pre-fetched in a small cell as opposed to augmentation being done on the small cell.

The edge computing device 145 discussed herein may also operate as an enriched local advertising server. Advertising at the edge computing device 145 or at an output near the edge computing device 145 may be physically augmented by the edge computing device 145. The edge computing device 145 may also serve advertisement data to the small cell and/or output near the small cell. An advertising server may run on the edge computing device 145, where the advertising server is configured to dynamically insert advertising content and data into content requested by the wireless device 115-*a* via the small cell. Specific advertising data and content may also be prefetched and cached at the edge computing device 145 based on the physical location of the edge computing device 145, and/or the location of the wireless device 115-*a* relative to the edge computing device 145. For example, an advertising server running on the edge computing device 145 may serve up content specifically targeted to users of wireless device 115-*a* operating in a sports stadium or grocery store aisle.

In some examples, prefetching and caching may be reactive. That is, prefetching and caching may be performed when the same or similar content is requested by at least one user. Content may be pre-fetched and cached when the small cell determines that the content is likely to be viewed by other users in the proximity. This determination may be based in part on, for example, user profiles for the users. Content may also likely be pre-fetched or consumed due to actions of other nearby users, who may not necessarily consuming the same content. Content may be pre-fetched and cached based on requested content on nearby or similar cells, which may be further based on demographics of the users.

The different edge nodes may have the same or differing storage and processing capabilities. In some examples, several small cells may form a cluster of small cells with a small cell acting as a cluster-head. The cluster-head small cell may be used for local storage, local service hosting, processing, and the like. In some examples, edge nodes have distributed processing and storage capabilities. Distributed caching may be performed amongst edge nodes (e.g., small cells). For example, some nodes may cache some content and other nodes cache other content (caching across sites can be a function of storage, backhaul, use, etc.). Caching can also be performed across multiple wireless devices, such as data being hashed across multiple devices.

Specific advertising data and content may also be prefetched and cached based on usage of data (e.g., websites visited, metadata, or other information) or searches performed by a wireless device 115-*a*, including wireless device 115-*a* previously in communication with the small cell base station 150-*b*, or in communication with other small cell base stations. Specific advertising data and content may also be prefetched and cached based at least in part on activity performed by a wireless device 115-*a* or other information collected by small cell base station 150-*b* about wireless device 115-*a*, including wireless device 115-*a* previously connected to the small cell base station 150-*b*, or connected to other small cell base stations. This activity or information about wireless device 115-*a* may include contents of past search requests, meta data concerning wireless device 115-*a*, web site visitation or application usage history, or information from one or more sensors of wireless device 115-*a*, for example gyroscope, accelerometer, temperature, or GPS sensors, information. The advertising data and content may also be prefetched and cached based at least in part on analytics for activity performed by other wireless devices, including wireless devices previously connected to small cell base station 150-*b* or other small cell base stations such as neighboring base stations. Such activity and information may be the same as for wireless device 115-*a*, but collected and analyzed for the other wireless devices.

In addition, the advertising server can communicate with other local input/output devices to provide physical stimuli to the user of the wireless device 115-*a* in addition to the wireless device 115-*a* itself. For example, the advertising server may direct the edge computing device 145 to activate lights, displays, speakers, devices to distribute scents, or other output devices that are physically located in proximity to the edge device and/or wireless device 115-*a* in connection with a request for content from the wireless device 115-*a*.

The edge computing device 145 may also perform local analytics for a wireless device 115-*a* based on contextual data for the wireless device 115-*a*, for example the physical location or trajectory of the wireless device 115-*a*, or the location, surroundings, etc. of other wireless devices 115-*a* in communication with the small cell base station where the edge computing device 145 is located. Such performance of local analytics by an edge computing device 145 may enhance user experience (e.g., when the user is in a small cell area with a dense deployment). For example, a user in a congested network may experience delays due to an excess of wireless traffic. Additionally, a central entity responsible for performing analytics may not have the local contextual information needed to supply location-specific services. Thus, offloading certain analytics to an edge computing device 145 (or a small cell base station 150) may decrease service delays and enable service relevant to the specific location of the user. For example, running an ad server on a small cell base station 150 or edge computing device 145 may reduce latency and provide richer content (e.g., contextually or situationally relevant content). In some cases, processing may be moved to and from the edge computing device 145 and wireless device 115-*a* based on availability of processing power and needs. The processed analytics data concerning location, user searches, may inform Google® AdWords®, bidding for advertisement, and the like.

Running an advertising server on the edge computing device 145 may allow the advertiser to serve richer advertising content by reducing the backhaul bandwidth required to serve the advertisements and reduce latency to deliver the advertisements to the user of the wireless device 115-*a*. As a result, it may be less expensive for a network operator to provide the advertising, because of the reduced use of network bandwidth, for example the backhaul network of a WWAN or an internet service provider (ISP) in communication with a WLAN. In such a case, the WWAN network operator or ISP may provide a discounted data rate to the user of the wireless device 115-*a* for advertising data served to the wireless device 115-*a* from the network computing device.

As a result of the proximity of edge computing device 145 to the WWAN small cell or WLAN access point, the edge computing device 145 may also control proximate input/output devices, also in communication with the edge computing device 145, to interact with and provide stimuli to the user of the wireless device 115-*a* according to a location of the user of the wireless device 115-*a*, sensor input from the wireless device 115-*a* or edge computing device 145, and/or the content of requests made by the wireless device 115-*a* user via the edge computing device 145.

The edge computing device 145 may also take in data concerning the location and environment of a wireless device 115-*a*, and by extension the user of the wireless device 115-*a*, to control input/output devices to stimulate a wireless device 115-*a* user. Sensor data for the wireless device 115-*a* and/or edge computing device 145 may be collected, e.g., from a microphone, temperature, or light sensor, or camera. Because of the proximity of the wireless device 115-*a* and the edge network device to which the wireless device 115-*a* is connected as well as the known location of the edge computing device 145, the edge computing device 145 may then use this information to control, according to data at the edge computing device 145, a device external to the wireless device 115-*a* itself that is within the known proximity of the user of the wireless device 115-*a*. The external device may deliver or serve advertising content or data. For example, an external device may be controlled by the edge computing device 145 to annotate data content provided to the edge computing device 145 by the wireless device 115-*a* according to information specific to the physical environment of the edge computing device 145. Annotating may include annotating the data content with images or text. As another example, the edge computing device 145 may control an input/output device (external to the edge computing device 145) to provide a stimulus to the user of the wireless device 115-*a* based on at least one characteristic of the wireless device 115-*a* user determined from the edge computing device 145, for example a physical location of the wireless device 115-*a* by virtue of proximity to the small cell base station to which the wireless device 115-*a* is connected, or the content of a request made by the user of the wireless device 115-*a*.

The edge computing device 145 may also have surplus computing resources that may host third party applications. These computing resources may also be provided for such purpose. Mobile applications typically run on a wireless device 115-*a* or on a network component, such as a content delivery network, or other server. At the same time, wireless device 115-*a* generally have limited computing power and battery life, while an edge computing device 145 will likely have a dedicated power connection. Thus, edge computing device 145 may be configured to allow use by third-party applications in proximity to the end user (i.e., the wireless device 115-*a*), but with fewer power and processing constraints than the wireless device 115-*a*.

In an example, an application running on a user's mobile device may be enhanced by a complementary application running on the edge computing device 145. The complementary application may provide processing that enhances the user experience, for example by monitoring incoming messages to the wireless device 115-*a* and sending alerts according to predefined parameters. The resources of the edge computing device 145 may also be provided as a service to a third party, for example by providing a virtual machine running on the edge computing device 145 to run the third party application. This way, the third party can provide an enhanced experience to the user of a wireless device 115-*a* by running the third party's own application in proximity to the wireless device 115-*a*, but where the application is under the direction and control of the third party. The third party can cache selected data or content to the edge computing device 145, and provide an application to the wireless device 115-*a* that interacts with the cached data or content. The application of the wireless device 115-*a* may also be provided to interact with the application running on the edge computing device 145 or server. Thus, the wireless device 115-*a* application may interact with distant servers through the WWAN and/or internet less frequently, enhancing the experience of the wireless device 115-*a* user. In addition, computation performed by the third-party application for the wireless device 115-*a* may be moved or transferred from the edge computing device 145 to a second edge computing device to follow a wireless device 115-*a* of the user from the edge computing device 145 to the second edge computing device.

Figure 2:
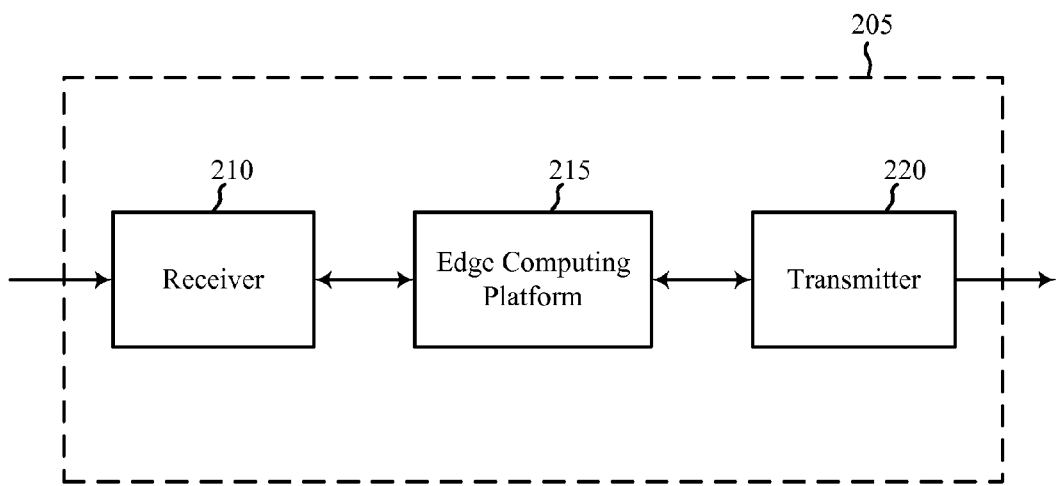
FIG. 2 shows a block diagram of a device configured for use in wireless communication to support an edge computing platform, in accordance with various aspects of the present disclosure.

FIG. 2 shows a block diagram 200 of an edge computing device 205 configured for use in wireless communication to support an edge computing device for a small cell, in accordance with various aspects of the present disclosure. The edge computing device 205 may be an example of one or more aspects of an edge computing device 145 described with reference to FIG. 1B. The edge computing device 205 may include a receiver 210, an edge computing platform 215, and/or a transmitter 220. The edge computing device 205 may also be or include a processor. Each of these modules may be in communication with each other. In some cases, the edge computing device 205 may be integrated with a small cell base station 150. In such cases, the edge computing device 205 may provide additional computing power for the small cell base station 150 and thus may not include the receiver 210 or the transmitter 220.

The edge computing device 205, through the receiver 210, the edge computing platform 215, and/or the transmitter 220, may be configured to perform functions described herein. For example, the edge computing device 205 may be configured to provide edge computing resources for a wireless device that is in communication with a small cell. Although the edge computing device 205 is shown encapsulating the edge computing platform 245, in some cases, the edge computing platform 245 encapsulates the edge computing device 205. That is, the edge computing device 245 may surround or include the edge computing device 205, the received 210, and/or the transmitter 220. Thus, the edge computing platform 245 may leverage the functionality of the edge computing device 205 to boost processing power.

The components of the edge computing device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver 210 may receive information such as packets, user data, and/or control information associated with various information channels (e.g., control channels, data channels, etc.). The receiver 210 may be configured to receive content, data, and other information requested from a network by a wireless device, which may include audio, video, advertising, webpage, or other data from a network at the request of a wireless device in communication with a small cell base station such as with the edge computing device 205, requests for such content or data sent from a wireless device, as well as requests to use edge computing resources by wireless devices, and inputs from various sensor or input/output devices. Information may be passed on to the edge computing platform 215 and to other components of the edge computing device 205.

The transmitter 220 may transmit one or more signals received from other components of the edge computing device 205. The transmitter 220 may transmit audio, video, advertising, webpage, or other data to a wireless device in communication with the small cell base station such as with the edge computing device 205, responses to requests to use edge computing resources by wireless devices, and outputs to displays, lights, or other input/output devices. In some examples, the transmitter 220 may be co-located or integrated with the receiver 210 in a transceiver module.

Figure 3:
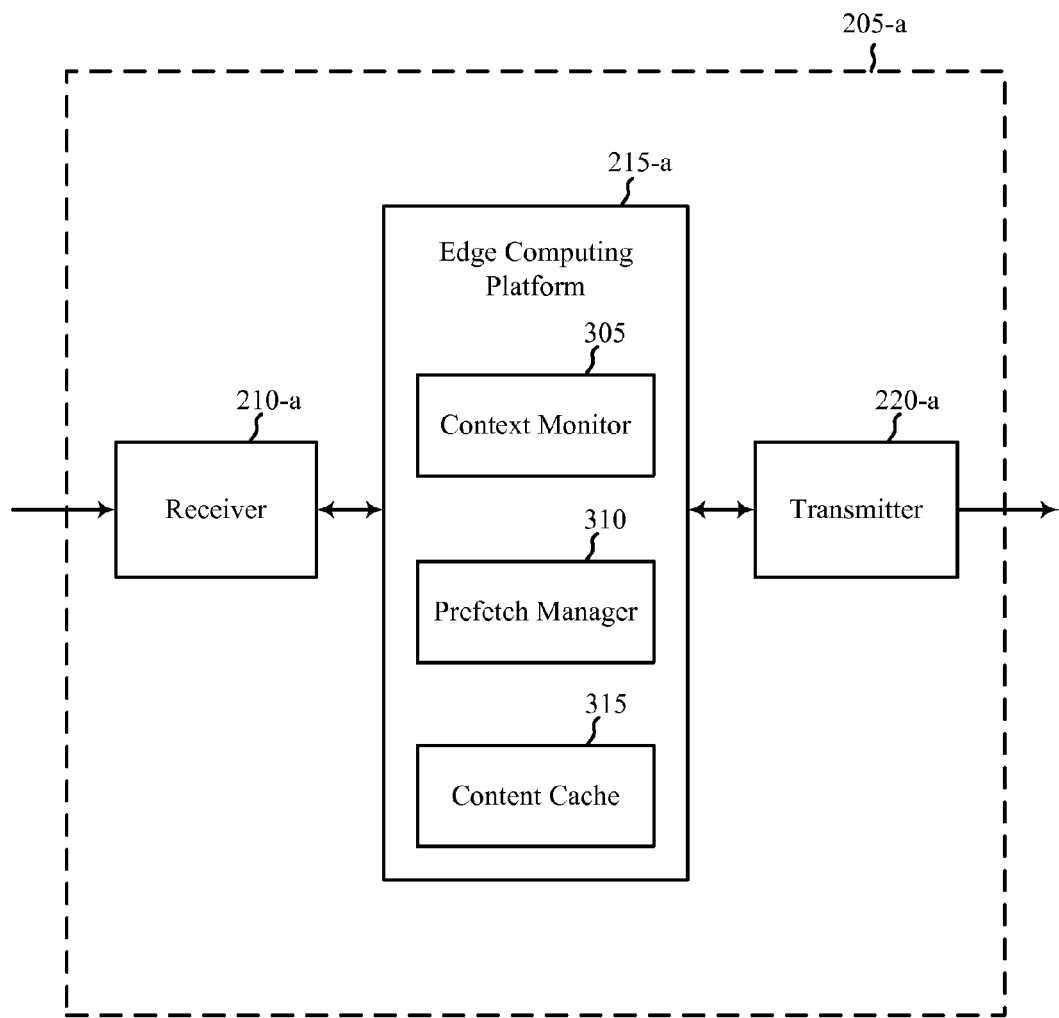
FIG. 3 shows a block diagram of another device configured for use in wireless communication to support an edge computing platform, in accordance with various aspects of the present disclosure.

FIG. 3 shows a block diagram 300 of another edge computing device 205-*a* configured for use in a wireless communications system for prefetching or otherwise retrieving content based on the specific context of a wireless device determined relative to a small cell, in accordance with various aspects of the present disclosure. The edge computing device 205-*a* may be an example of one or more aspects of the edge computing device 205 described with reference to FIG. 2 or the edge computing device 145 described with reference to FIGS. 1A and 1B. The edge computing device 205-*a* may include a receiver 210-*a*, an edge computing platform 215-*a*, and/or a transmitter 220-*a*. The edge computing device 205 may also be or include a processor. Each of these modules may be in communication with each other.

The edge computing device 205-*a*, through the receiver 210-*a*, the edge computing platform 215-*a*, and/or the transmitter 220-*a*, may be configured to perform functions described herein. For example, the edge computing device 205-*a* may be configured to provide edge computing resources for a wireless device that is in communication with a small cell base station. The receiver 210-*a* and the transmitter 220-*a* may operate similarly to the receiver 210 and the transmitter 220 as described in FIG. 2, respectively. The components of the edge computing device 205-*a* may, individually or collectively, be implemented similarly to the components of the edge computing device 205 of FIG. 2.

The edge computing platform 215-*a* may include a context monitor 305, a prefetch manager 310, and a content cache 315. The edge computing platform 215-*a* may efficiently retrieve and store data or other content for use by end users associated with a small cell.

The context monitor 305 may determine an operating context of a small cell base station, such as small cell base station 150 described with respect to FIG. 1A. A base station of the small cell may be co-located with the edge computing device 205-*a*. The operating context may be, for example, a user profile. In some examples, the user profile may be a set of parameters for a particular user, mobile device, edge computing device, or location. The user profile may be based on what a particular user is doing regarding content. The context monitor 305 may also analyze user data and previous content use to predict what the user may wish to do next, such as what content the user would like to interact with or use. In some examples, the context monitor 305 may create a user profile for a user that the context monitor 305 has not seen before. In some examples, the user profiles are not for a specific user.

In other examples, the user profile may be information related to use of content among one or more users. For example, the user profile may include how often particular content data has been downloaded or otherwise viewed by one or more users associated with a small cell. The context monitor 305 may generate the user profile based at least in part on a plurality of content requests received by the small cell base station from a plurality of mobile devices previously in communication with the small cell base station. In some examples, the context monitor 305 gathers sensor data from one or more sensors associated with the small cell to determine the operating context of the small cell.

The prefetch manager 310 may retrieve content from a network to the edge computing device based at least in part on the operating context. The content may be received from other wireless devices, base stations, or a core network. On other examples, the content may be data that is resident on the small cell base station. The small cell base station may be, for example, a server for the content.

The content cache 315 may store the content at the edge computing device for subsequent access by a mobile device in the small cell. The content cache 315 may be one or more storage devices or may be associated with one or more storage devices. Content stored by the content cache 315 in a memory may be accessible to any mobile device associated with the small cell. Storing the content may reduce demand on a backhaul network and may reduce signaling to the core network.

The content may be stored in the content cache 315 for a duration determined by the context monitor 305. The content cache 315 may delete some stored content when the context monitor 305 determines there is a small likelihood of the content being accessed again, according to a prioritization of content when the cache is near full, or some any other reason to no longer store the content.

Figure 4:
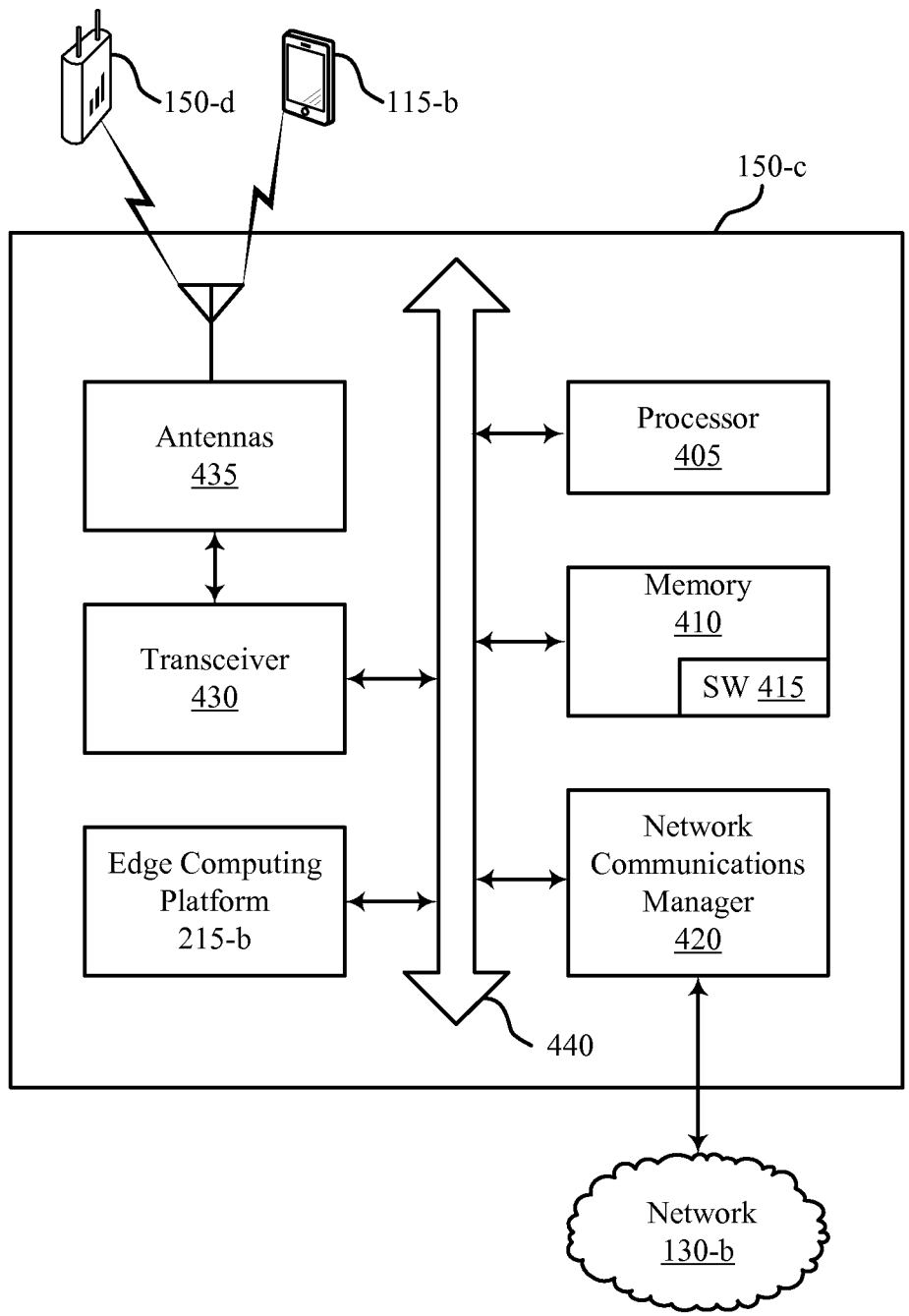
FIG. 4 shows a diagram that illustrates a small cell base station configured for providing edge computing resources co-located with the small cell base station, in accordance with various aspects of the present disclosure.

FIG. 4 shows a diagram 400 that illustrates a small cell base station 150-c configured for providing edge computing resources co-located with the small cell base station 150-c, in accordance with various aspects of the present disclosure. In some aspects, the small cell base station 150-c may be an example of the small cells 150 of FIGS. 1A-1B. The small cell base station 150-c may include a processor 405, a memory 410, a transceiver 430, antennas 435, and an edge computing platform 215-b. The edge computing platform 215-b may be an example of the edge computing platform 215 of FIGS. 2-3. In some examples, the small cell base station 150-c may also include a network communications manager 420. Each of processor 405, memory 410, transceiver 430, network communications manager 420, and edge computing platform 215-b may be in communication with each other, directly or indirectly, over at least one bus 440.

The memory 410 may include random access memory (RAM) and read-only memory (ROM). The memory 410 may also store computer-readable, computer-executable software (SW) code 415 containing instructions that are configured to, when executed, cause the processor 405 to perform various functions described herein to provide edge computing resources to wireless devices in communication with the small cell base station 150-c, for example as further described with reference to FIGS. 1A, 1B, 2, and 3. Alternatively, the code 415 may not be directly executable by the processor 405 but be configured to cause the small cell base station 150-c, e.g., when compiled and executed, to perform functions described herein.

The processor 405 may include an intelligent hardware device, e.g., a central processing unit (CPU), a microcontroller, an ASIC, and the like. The processor 405 may process information received through the transceiver 430 and/or the network communications manager 420. The processor 405 may also process information to be sent to the transceiver 430 for transmission through the antennas 435 and/or to the network communications manager 420. The processor 405 may handle, alone or in connection with the edge computing platform 215-b, various aspects related to providing edge computing resources to wireless devices in communication with the small cell base station 150-c.

The transceiver 430 may include a modem configured to modulate packets and provide the modulated packets to the antennas 435 for transmission as well as to demodulate packets received from the antennas 435. The transceiver 430 may be implemented as at least one transmitter module and at least one separate receiver module. The transceiver 430 may be configured to communicate bi-directionally, via the antennas 435, with at least one wireless device 115 as illustrated in FIGS. 1A and 1B, for example. The small cell base station 150-c may typically include multiple antennas 435 (e.g., an antenna array). The small cell base station 150-c may communicate with a core network 130-b through the network communications manager 420. Using the transceiver 430 and antennas 435, the small cell base station 150-c may communicate with other small cell base stations 150, such as small cell base station 150-d.

The components of small cell base station 150-c may be configured to implement aspects discussed above with reference to FIGS. 1A, 1B, 2, and 3, and those aspects are not repeated here for the sake of brevity. Moreover, the components of the small cell base station 150-c may be configured to implement aspects discussed below with respect to FIGS. 5-10 and those aspects are not repeated here also for the sake of brevity.

Figure 5:
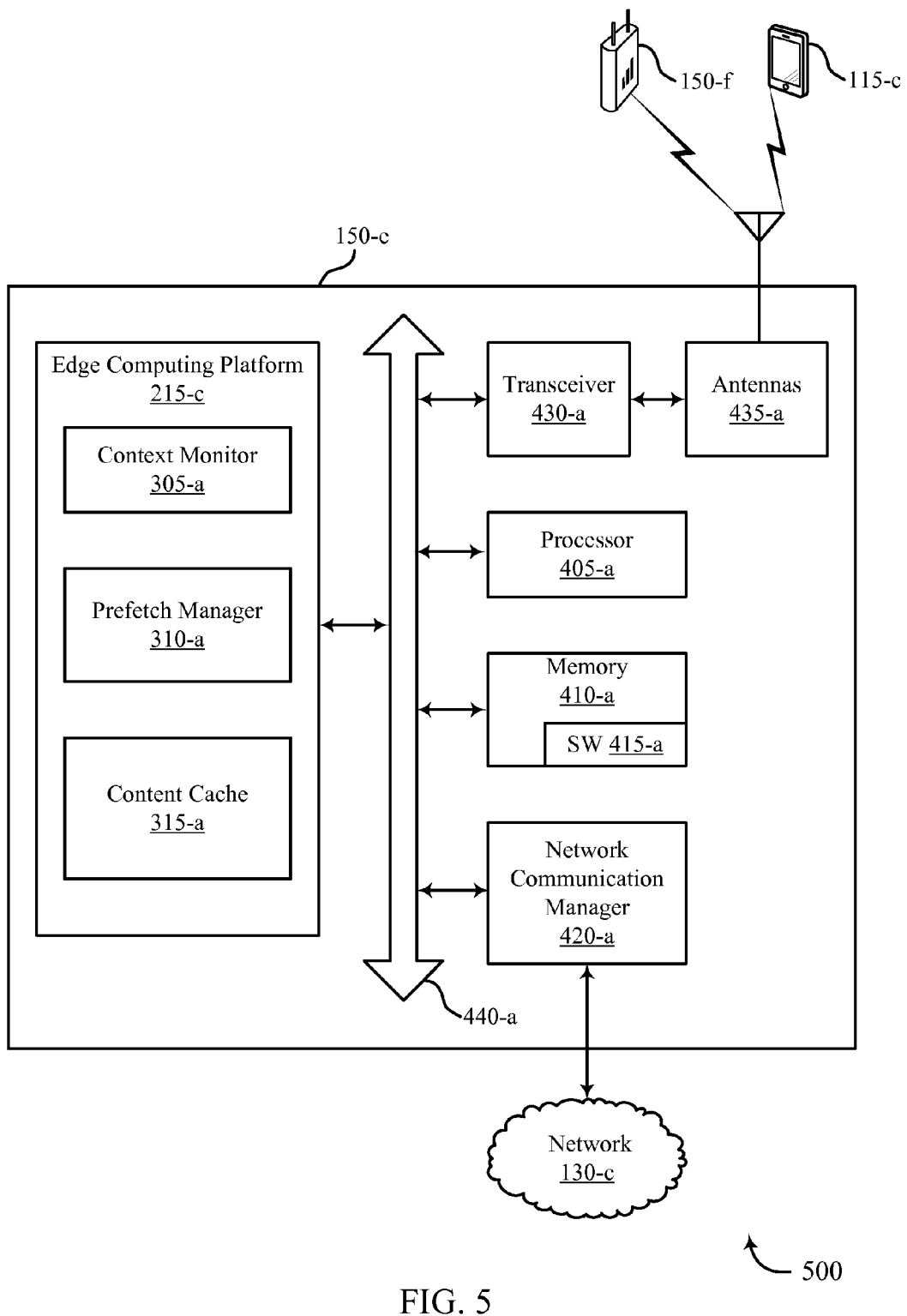
FIG. 5 shows a block diagram of another wireless communications system, in accordance with various aspects of the present disclosure.

FIG. 5 shows a block diagram 500 of another wireless communications system, in accordance with various aspects of the present disclosure. The diagram 500 illustrates a small cell base station 150-e to provide co-located edge computing resources. In some aspects, the small cell base station 150-e may be an example of the small cells 150 of FIGS. 1A-1B and 4. The small cell base station 150-e may include a processor 405-a, a memory 410-a, a transceiver 430-a, antennas 435-a, and an edge computing platform 215-c. The edge computing platform 215-c may be an example of the edge computing platform 215 of FIGS. 2-3. In some examples, the small cell base station 150-e may also include a network communications manager 420-a. Each of processor 405-a, memory 410-a, transceiver 430-a, network communications manager 420-a, and edge computing platform 215-c may be in communication with each other, directly or indirectly, over at least one bus 440-a. The small cell base station 150-e may communicate with a small cell base station 150-f and a wireless device 115-c.

The edge computing platform 215-c may include a context monitor 305-a, a prefetch manager 310-a, and a content cache 315-a. In some aspects, the context monitor 305-a, the prefetch manager 310-a, and the content cache 315-a may be an example of the context monitor 305, the prefetch manager 310, and the content cache 315 of FIG. 3, respectively. The edge computing platform 215-c may retrieve and store data or other content for use by end users associated with the small cell base station 150-e.

The context monitor 305 may determine an operating context of the small cell base station 150-e, wherein a base station of the small cell base station 150-e is co-located with an edge computing device. The prefetch manager 310-a may retrieving content from a network, such as a network 130-c, to the edge computing device based at least in part on the operating context. The content cache 315-a may store the content at the edge computing device for subsequent access by the wireless device 115-c associated with the small cell base station 150-e.

The components of small cell base station 150-c may be configured to implement aspects discussed above with reference to FIGS. 1A, 1B, 2, 3, and 4, and those aspects are not repeated here for the sake of brevity. Moreover, the components of the small cell base station 150-e may be configured to implement aspects discussed below with respect to FIGS. 5-10 and those aspects are not repeated here also for the sake of brevity.

Figure 6:
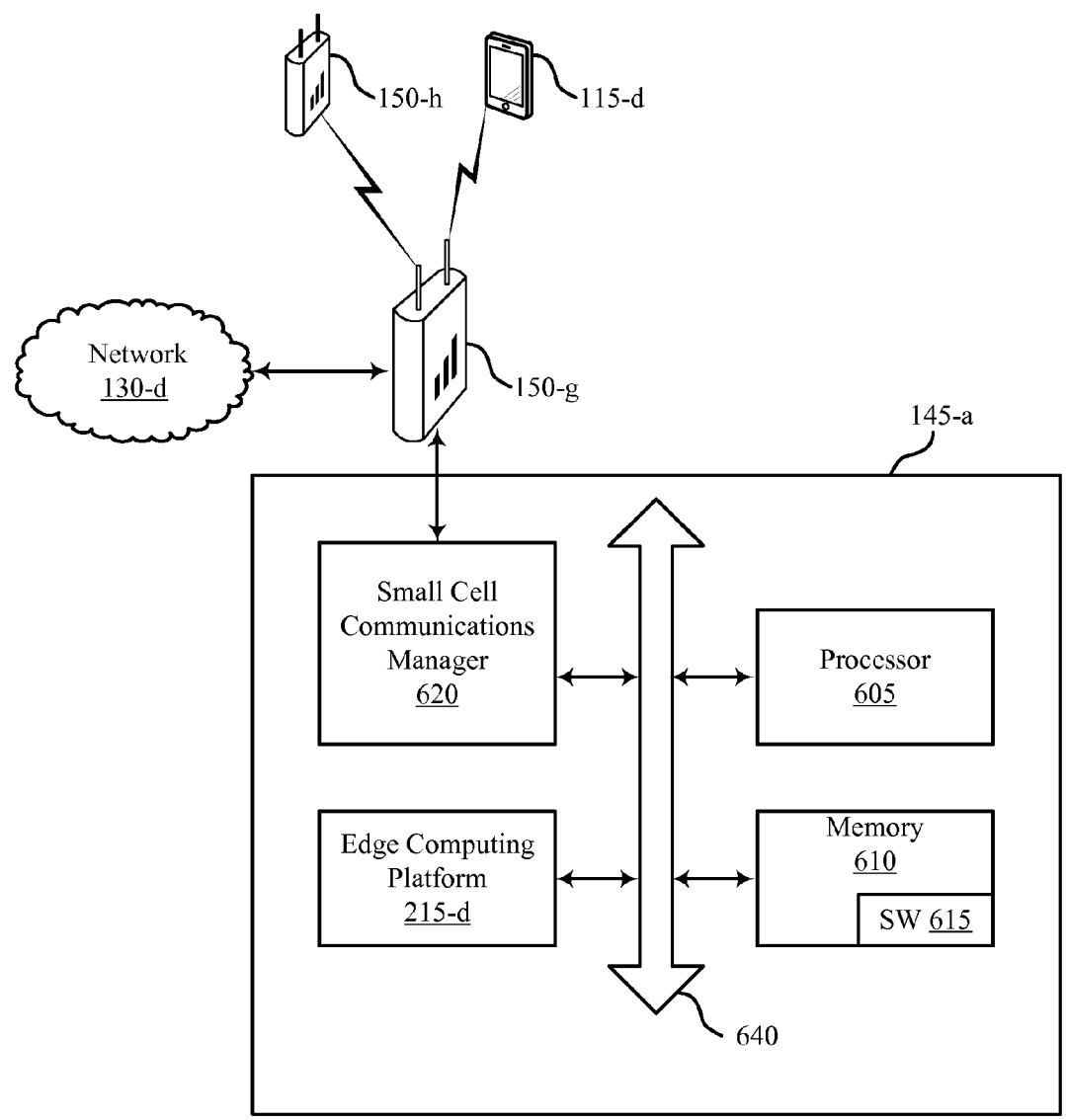
FIG. 6 shows a diagram that illustrates an edge computing device configured for providing edge computing resources co-located with the small cell base station, in accordance with various aspects of the present disclosure.

FIG. 6 shows a diagram 600 that illustrates an edge computing device 145-a configured for providing edge computing resources co-located with a small cell base station 150-g, in accordance with various aspects of the present disclosure. In FIG. 6, the small cell base station 150-g is physically distinct from the edge computing device 145-a. The edge computing device 145-a may include a processor 605, a memory 610, a small cell communications manager 620, and an edge computing platform 215-d.

The edge computing platform 215-d may be one or more aspects of an example of the edge computing platform 215 of FIGS. 2-5. The edge computing platform 215-d may communicate, via the small cell communications manager 620, with a network 130-d to which the small cell base station 150-g is connected. In some aspects, the small cell base station 150-g and a small cell base station 150-h may be an example of the small cell base stations 150 of FIGS. 1A-1B and 4-5. Likewise, the wireless device 115-*d* may be an example of the wireless devices 115 of FIGS. 1A-1B and 4-5.

The components of the edge computing device 145-*a* may be configured to implement aspects discussed above with reference to FIGS. 1A-5, and those aspects may not be repeated here for the sake of brevity.

The processor 605 may be one or more aspects of an example of the processor 405 of FIG. 4. The processor 605 may include an intelligent hardware device, e.g., a CPU, a microcontroller, an ASIC, and the like. The processor 605 may process information received through the small cell communications manager 620 or the edge computing platform 215-*d*. The processor 605 may also process information to be sent to the transceiver 430 for transmission via the small cell communications manager 620. The processor 605 may handle, alone or in connection with the edge computing platform 215-*d*, various aspects related to providing edge computing resources to wireless devices in communication with the small cell base station 150-*g*. In some examples, the processor 605 is the edge computing platform 215-*d*.

The memory 610 may be an example of the memory 410 of FIG. 4. The memory 610 may store computer-readable, computer-executable SW code 615 containing instructions that are configured to, when executed, cause the processor 605 to perform various functions described herein to provide edge computing resources to wireless devices in communication with a small cell base station, for example as further described with reference to FIGS. 1A-5. Alternatively, the code 615 may not be directly executable by the processor 605 but be configured to cause the computer, e.g., when compiled and executed, to perform functions described herein.

Moreover, the components of the edge computing device 145-*a* may be configured to implement aspects discussed below with respect to respect to FIGS. 7-10 and those aspects may not be repeated here also for the sake of brevity.

Figure 7:
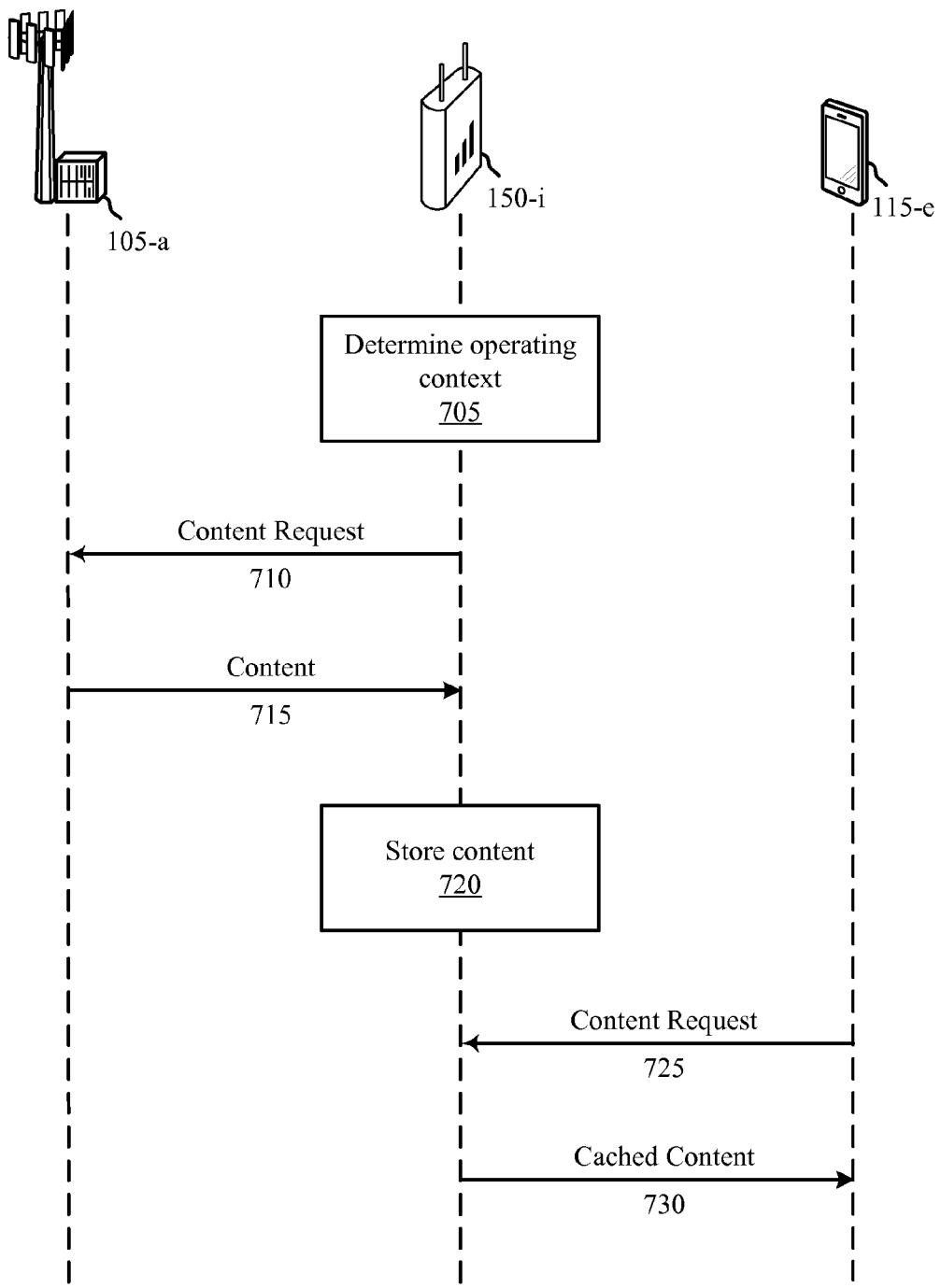
FIGS. 7 and 8 are process flows illustrating examples of a method for wireless communication, in accordance with various aspects of the present disclosure.

FIG. 7 is a flow chart illustrating an example of a process 700 for wireless communication, in accordance with various aspects of the present disclosure. The process 700 includes a base station 105-*a*, a small cell base station 150-*i*, and a wireless device 115-*e*. The base station 105-*a* may be an example of aspects of the base station 105 of FIGS. 1A and 1B. The small cell base station 150-*i* may be an example of aspects of the small cell base station 150 described with reference to FIGS. 1A, 1B, and 4-6 or an example of one or more aspects of the edge computing device 205 described with reference to FIGS. 2 and 3. The wireless device 115-*e* may be an example of aspects of the wireless device 115 described with reference to FIGS. 1A, 1B, and 4-6. In some examples of the process 700, instead of the base station 105-*a*, the small cell 150-*i* can communicate with an element of a network (e.g., an element of core network 130) or another small cell.

In this example, the small cell base station 150-*i* is in communication with the base station 105-*a* and the wireless device 115-*e* is associated with the small cell base station 150-*i*. The small cell base station 150-*i* determines an operating context (705). The operating context may be based on a user profile, sensor data of one or more sensors associated with the small cell base station 150-*i*, a location of the small cell base station 150-*i*. The user profile may be based on content use of one or more wireless devices associated with the small cell base station 150-*i* or with other small cells.

From the operating context, the small cell base station 150-*i* may determine content to prefetch. The selection of this content may be based on content used by other users in the small cell base station 150-*i* or a use history of a particular user. In other examples, different reasons or metrics are used to select the content, such as, for example, a user identifying the content to be prefetched. The small cell base station 150-*i* may query the base station 105-*a* for the content by sending a content request 710.

In response to receiving the content request 710, the base station 105-*a* may retrieve the content. If the base station 105-*a* does not have the content cached, the base station 105-*a* may retrieve the content from a network, such as the core network 130 described in FIG. 1A. The base station 105-*a* forwards the content to the small cell base station 150-*i*.

The small cell base station 150-*i* may store the content (720). The small cell base station 150-*i* may cache the content for a particular time period or until the small cell base station 150-*i* determines the content is no longer useful to cache.

The wireless device 115-*e* may send a content request 725 that requests the particular content from the small cell base station 150-*i*. The small cell base station 150-*i* may retrieve the content being requested in the content request 725 from the stored content. The small cell base station 150-*i* may provide the cached content 730 to the wireless device 115-*e*. In some examples, the cached content 730 may be an action (e.g., a change to a light, such as brighten an LED). The action can be cached and performed later. In other examples, the content request 725 is a content request or a sensor input from another user.

Figure 8:
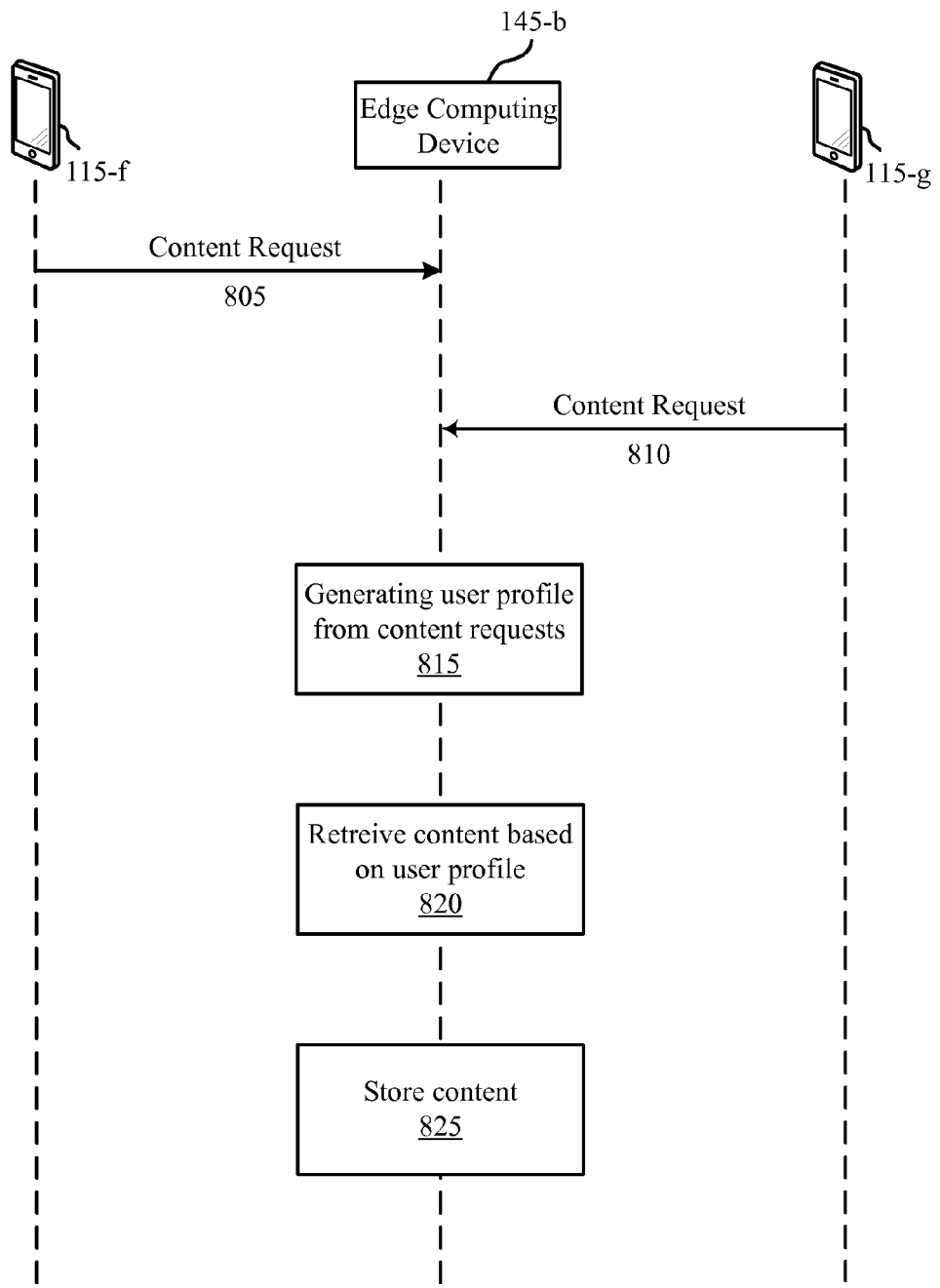

FIG. 8 is a flow chart illustrating an example of a process 800 for wireless communication, in accordance with various aspects of the present disclosure. The process 800 includes a first wireless device 115-*f*, an edge computing device 145-*b*, and a second wireless device 115-*g*. The edge computing device 145-*b* may be an example of aspects of the edge computing device 145 described with reference to FIG. 1B or an example of one or more aspects of the edge computing device 205 described with reference to FIGS. 2 and 3. The wireless devices 115-*f*, 115-*g* may be an example of aspects of the wireless device 115 described with reference to FIGS. 1A, 1B, and 4-7.

The first and second wireless devices 115-*f*, 115-*g* may be associated with a small cell base station of which the edge computing device 145-*b* is part. The first wireless device 115-*f* may send a content request 805 for particular content to the edge computing device 145-*b*. Likewise, the second wireless device 115-*g* may send a content request 810 for content to the edge computing device 145-*b*. The content requests 805, 810 may request the same or different content.

From the content requests 805, 810, as well as from additional content requests, the edge computing device 145-*b* may generate one or more user profiles (815). The user profiles may be based on previous use of a particular user or, as shown in FIG. 8, use of users of the wireless devices 115-*f*, 115-*g*. However, in some examples, user profiles may not be available, such as when the edge computing device 145-*b* is within a small cell for an area with many transient users, including a stadium, mall, concert hall, or the like. In this case, the edge computing device 145-*b* may determine operating context based on one or more shared interests of the users in the location that can be determined without knowing any individual profiles.

The edge computing device 145-*b* may retrieve content from a network based on the user profiles (820). For example, if the small cell is a stadium, the edge computing device 145-*b* may determine that the operating context is associated with an upcoming sporting event scheduled at the stadium. The edge computing device 145-*b* may retrieve content including statistics on the competing teams and players, scores, weather, or any other relevant content. The edge computing device 145-*b* may store the retrieved content within the small cell for future requests for the content by the wireless devices 115-*f*, 115-*g* or any other wireless device associated with the small cell.

Figure 9:
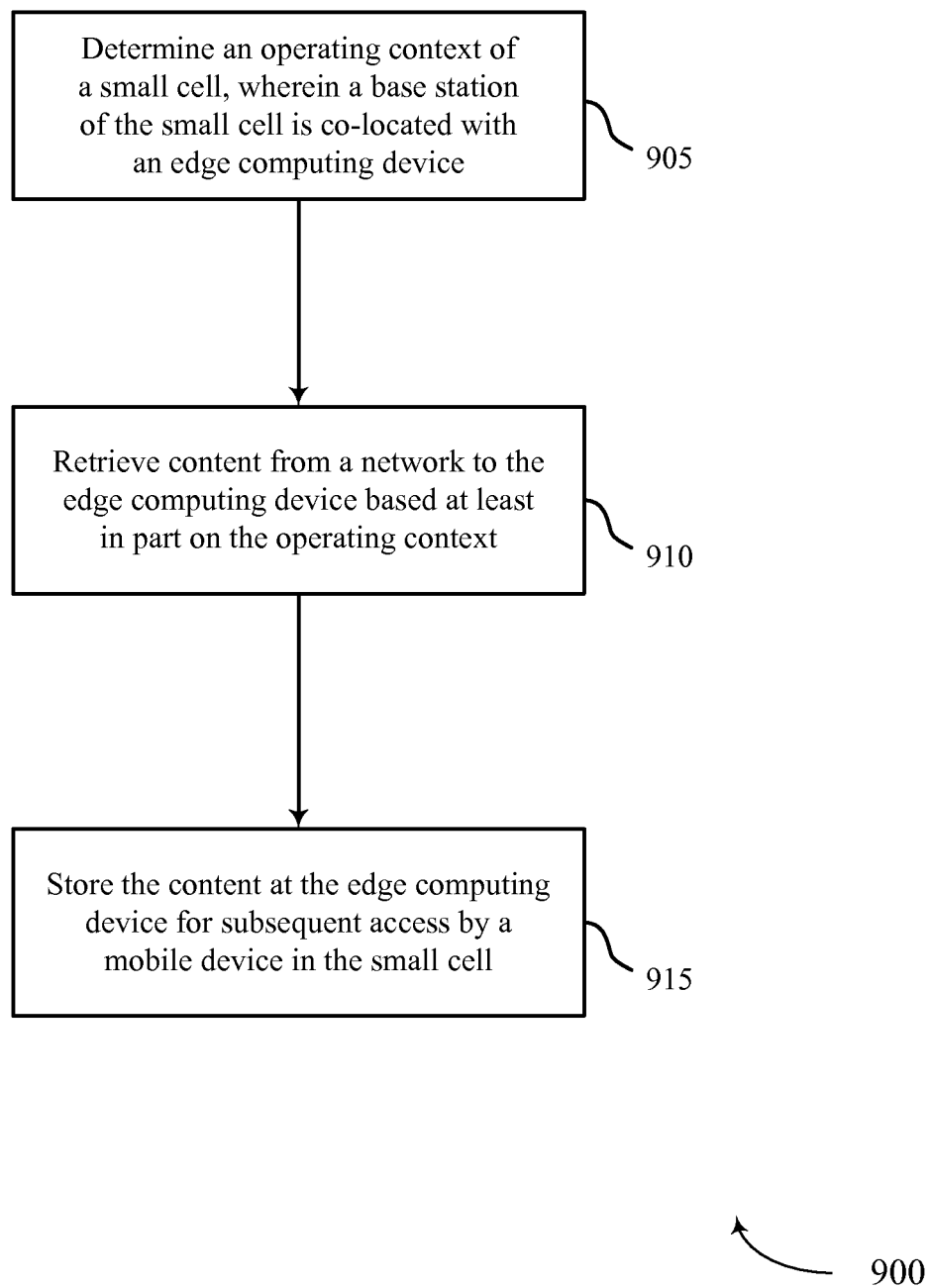
FIGS. 9 and 10 are flow charts illustrating examples of a method for wireless communication, in accordance with various aspects of the present disclosure.

FIG. 9 shows a flowchart illustrating a method 900 for wireless communication, in accordance with various aspects of the present disclosure. The operations of method 900 may be implemented by a small cell base station 150, an edge computing device 145, and/or a small cell platform 140, as described with reference to FIGS. 1A, 1B, and 2-8. For example, the operations of method 900 may be performed by the small cell base station 150 as described with reference to FIGS. 1A, 1B, and 4-7. In some examples, the small cell base station 150, edge computing device 145, and/or a small cell platform 140 may execute a set of codes to control the functional elements of the small cell base station 150, edge computing device 145, and/or a small cell platform 140 to perform the functions described below. Additionally or alternatively, the wireless device may perform aspects the functions described below using special-purpose hardware.

At block 905, the method 900 includes determining an operating context of a small cell, wherein a base station of the small cell is co-located with an edge computing device. The small cell may be one of a picocell, a femtocell, a microcell, or a Wi-Fi access point. The small cell may include a WWAN transceiver and a WLAN transceiver.

In some examples, the operating context includes a user profile associated with the mobile device. In such an example, the method 900 further includes generating the user profile based at least in part on a plurality of content requests received by the small cell from a plurality of mobile devices previously wirelessly in communication with the small cell. In some examples, the operating context includes a physical location of the small cell.

Determining the operating context of the small cell may also include gathering sensor data from a sensor associated with the small cell. The sensor may be one or more of a microphone, a temperature sensor, a light sensor, or a camera.

In some examples, the operating context is based at least in part on data relating to prior requests for the content by a second mobile device previously in the small cell. Further, the operating context may be based at least in part on related content previously requested by the mobile device from the network via the small cell.

The method 900 may further include retrieving content from a network to the edge computing device based at least in part on the operating context (910). The content may includes HyperText Transfer Protocol (HTTP) content and web page data, for example. In other examples, the content includes other types of data, such as video, images, sensor data, or the like. In some examples, retrieving content from the network may be further based on a likelihood of reusability of the content. That is, the method 900 may retrieve content more likely to be reused and not retrieve content less likely to be reused.

The method 900 may further include storing the content at the edge computing device for subsequent access by a mobile device in the small cell. The method 900 may store the content for future reuse. In some examples, the method 900 includes transferring the content from the small cell base station to a second small cell base station based at least in part on an expected change in a physical location of the mobile device. The method 900 may further include determining the expected change in the physical location of the mobile device based at least in part on data relating to a change in a physical location of a second mobile device previously in the small cell.

In some examples, the wireless communication resources of the base station are housed in a first module and the edge computing device is housed in a second module in communication with the first module.

Figure 10:
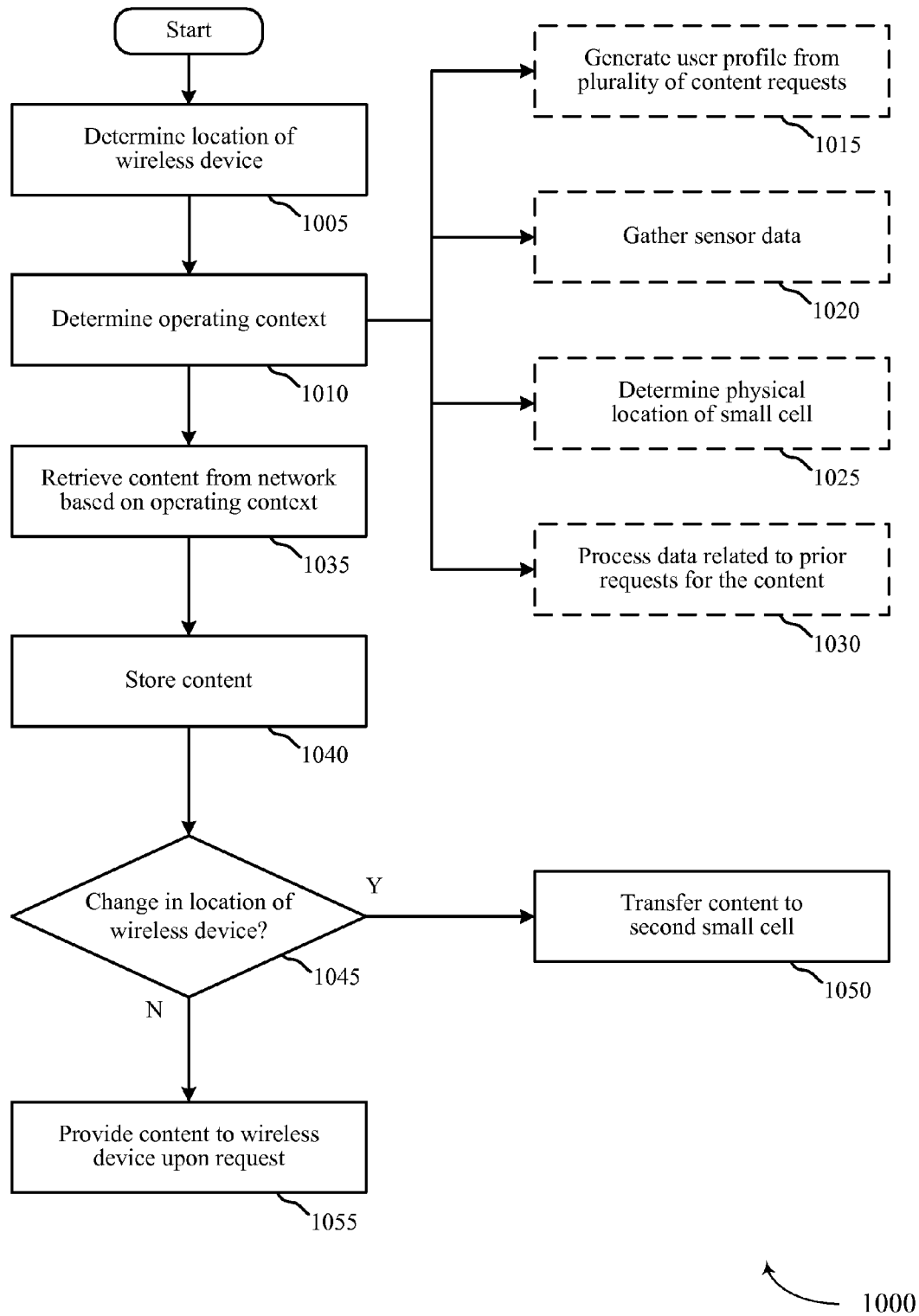

FIG. 10 shows a flowchart illustrating a method 1000 for wireless communication, in accordance with various aspects of the present disclosure. The operations of method 1000 may be implemented by a small cell base station 150, an edge computing device 145, and/or a small cell platform 140, as described with reference to FIGS. 1A, 1B, and 2-8. For example, the operations of method 1000 may be performed by the small cell base station 150 as described with reference to FIGS. 1A, 1B, and 4-7. In some examples, the small cell base station 150, edge computing device 145, and/or a small cell platform 140 may execute a set of codes to control the functional elements of the small cell base station 150, edge computing device 145, and/or a small cell platform 140 to perform the functions described below. Additionally or alternatively, the wireless device may perform aspects the functions described below using special-purpose hardware.

The method 1000 may begin at block 1005 with determining a location of the wireless device. The method then includes determining an operating context at block 1010. The operating context may be based on one or more of the types of information at blocks 1015, 1020, 1025, and 1030. For example, the method 1000 may generate a user profile from a plurality of context requests to determine the operating context. The plurality of content requests may be from one or more wireless devices associated with the small cell or other small cells proximate to the small cell. In another example, the method 1000 may gather sensor data (e.g., images, video, temperature, sound, light intensity, etc.) to determine the operating context. In yet another example, the method 1000 may determine a physical location of the small cell to determine the operating context. Additionally, the method 1000 may process data related to prior requests for particular content to determine the operating context. In other examples, the operating context may be based on other information.

The method 1000 may retrieve content from the network based on the operating context at block 1035. Once the content is received, the method 1000 may store the content within the small cell at block 1040.

The method 1000 may determine if there has been a change in location of the wireless device at block 1045. If so, the method 1000 may include transferring the content to a second small cell, wherein the wireless device is now associated with the second small cell at block 1050. If the method 1000 determines there has not been a change in location of the wireless device (e.g., the wireless device is still within the small cell), the method 1000 provides the content to the wireless device upon request for the content by the wireless device at block 1055.

Thus, methods 900 and 1000 may provide for reducing network load for a small cell. It should be noted that these methods describe possible implementations, and that the operations and the steps may be rearranged or otherwise modified such that other implementations are possible. In some examples, aspects from two or more of the methods 900 and 1000 may be combined.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   determining at an edge computing device an operating context of a small cell, wherein a base station of the small cell is co-located with the edge computing device;
   retrieving content from a network to the edge computing device based at least in part on the operating context and on a likelihood of reusability of the content; and
   storing the content at the edge computing device for subsequent access by a mobile device in the small cell.

2. The method of claim 1, wherein the operating context comprises a user profile associated with the mobile device, the method further comprising:
   generating the user profile based at least in part on data packets received previously by the small cell or a nearby small cell from a plurality of mobile devices wirelessly in communication with the small cell or the nearby small cell.

3. The method of claim 1, wherein determining the operating context of the small cell comprises:
   gathering sensor data from a sensor associated with the small cell.

4. The method of claim 3, wherein the sensor is one or more of a microphone, a temperature sensor, a light sensor, or a camera.

5. The method of claim 1, further comprising:
   transferring the content from the small cell to a second small cell based at least in part on an expected change in a physical location of the mobile device.

6. The method of claim 5, further comprising:
determining the expected change in the physical location of the mobile device based at least in part on data relating to a change in a physical location of a second mobile device previously in the small cell.

7. The method of claim 1, wherein the operating context comprises a physical location of the small cell.

8. The method of claim 1, wherein the operating context comprises data relating to prior requests for the content by a second mobile device previously in the small cell.

9. The method of claim 1, wherein the operating context is based at least in part on related content previously requested by the mobile device from the network via the small cell.

10. The method of claim 1, wherein the content includes HyperText Transfer Protocol (HTTP) content and web page data.

11. The method of claim 1, wherein
wireless communication resources of the base station are housed in a first module; and
the edge computing device is housed in a second module in communication with the first module.

12. The method of claim 1, wherein the small cell is one of a picocell, a femtocell, a microcell, or a Wi-Fi access point.

13. The method of claim 1, wherein the small cell comprises a wireless wide area network (WWAN) transceiver and a wireless local area network (WLAN) transceiver.

14. An apparatus for wireless communication, comprising:
means for determining at an edge computing device an operating context of a small cell, wherein a base station of the small cell is co-located with the edge computing device;
means for retrieving content from a network to the edge computing device based at least in part on the operating context and on a likelihood of reusability of the content; and
means for storing the content at the edge computing device for subsequent access by a mobile device in the small cell.

15. The apparatus of claim 14, wherein the operating context comprises a user profile associated with the mobile device, the apparatus further comprising:
means for generating the user profile based at least in part on data packets received previously by the small cell or a nearby small cell from a plurality of mobile devices wirelessly in communication with the small cell or the nearby small cell.

16. The apparatus of claim 14, wherein means for determining the operating context comprises:
means for gathering sensor data from a sensor associated with the small cell, wherein the sensor is one or more of a microphone, a temperature sensor, a light sensor, or a camera.

17. The apparatus of claim 14, further comprising:
means for transferring the content from the small cell to a second small cell based at least in part on an expected change in a physical location of the mobile device.

18. The apparatus of claim 14, further comprising:
means for determining the expected change in the physical location of the mobile device based at least in part on data relating to a change in a physical location of a second mobile device previously in the small cell.

19. An apparatus for wireless communication, comprising:
a processor;
memory in electronic communication with the processor; and
instructions stored in the memory and operable, when executed by the processor, to cause the apparatus to:
determine at an edge computing device an operating context of a small cell, wherein a base station of the small cell is co-located with the edge computing device;
retrieve content from a network to the edge computing device based at least in part on the operating context and on a likelihood of reusability of the content; and
store the content at the edge computing device for subsequent access by a mobile device in the small cell.

20. The apparatus of claim 19, wherein the operating context comprises a user profile associated with the mobile device, and wherein instructions stored in the memory and operable, when executed by the processor, further cause the apparatus to:
generate the user profile based at least in part on data packets received previously by the small cell or a nearby small cell from a plurality of mobile devices wirelessly in communication with the small cell or the nearby small cell.

21. The apparatus of claim 19, wherein instructions stored in the memory and operable, when executed by the processor, further cause the apparatus to:
gather sensor data from a sensor associated with the small cell, wherein the sensor is one or more of a microphone, a temperature sensor, a light sensor, or a camera.

22. The apparatus of claim 19, wherein instructions stored in the memory and operable, when executed by the processor, further cause the apparatus to:
transfer the content from the small cell to a second small cell based at least in part on an expected change in a physical location of the mobile device.

23. A non-transitory computer-readable medium storing code for wireless communication, the code comprising instructions executable to:
determine at an edge computing device an operating context of a small cell, wherein a base station of the small cell is co-located with the edge computing device;
retrieve content from a network to the edge computing device based at least in part on the operating context and on a likelihood of reusability of the content; and
store the content at the edge computing device for subsequent access by a mobile device in the small cell.

24. The non-transitory computer-readable medium of claim 23, wherein the operating context comprises a user profile associated with the mobile device, the code further comprising instructions executable to:
generate the user profile based at least in part on data packets received previously by the small cell or a nearby small cell from a plurality of mobile devices wirelessly in communication with the small cell or the nearby small cell.

25. The non-transitory computer-readable medium of claim 23, the code further comprising instructions executable to:
gather sensor data from a sensor associated with the small cell, wherein the sensor is one or more of a microphone, a temperature sensor, a light sensor, or a camera.

26. The non-transitory computer-readable medium of claim 23, the code further comprising instructions executable to:

transfer the content from the small cell to a second small cell based at least in part on an expected change in a physical location of the mobile device.

* * * * *